United States Patent
Mizushima et al.

(10) Patent No.: US 7,590,319 B2
(45) Date of Patent: Sep. 15, 2009

(54) PREFORM FOR PLASTIC OPTICAL MATERIAL, PRODUCTION METHOD THEREOF, OPTICAL COUPLING METHOD OF PLASTIC OPTICAL FIBER AND CONNECTOR USED FOR OPTICAL COUPLING

(75) Inventors: Yasuyuki Mizushima, Shizuoka (JP);
Yoshisada Nakamura, Shizuoka (JP);
Katsuya Takemasa, Shizuoka (JP);
Masataka Sato, Shizuoka (JP); Hiroki Takahashi, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 83 days.

(21) Appl. No.: 11/050,000

(22) Filed: Feb. 4, 2005

(65) Prior Publication Data
US 2005/0175290 A1    Aug. 11, 2005

(30) Foreign Application Priority Data

| Feb. 6, 2004 | (JP) | 2004-031131 |
| Mar. 26, 2004 | (JP) | 2004-093274 |

(51) Int. Cl.
| G02B 6/26 | (2006.01) |
| G02B 6/42 | (2006.01) |
| G02B 6/02 | (2006.01) |
| G02B 6/028 | (2006.01) |
| G02B 6/032 | (2006.01) |
| G02B 6/036 | (2006.01) |
| G02B 6/00 | (2006.01) |
| G02B 6/32 | (2006.01) |
| B29D 11/00 | (2006.01) |
| G02B 6/10 | (2006.01) |

(52) U.S. Cl. ............... 385/50; 385/34; 385/123; 385/124; 385/125; 385/127; 264/1.24; 264/1.29

(58) Field of Classification Search ............... 385/50, 385/34, 123, 124, 125, 127
See application file for complete search history.

(56) References Cited

U.S. PATENT DOCUMENTS 5,384,874 A * 1/1995 Hirai et al. ............... 385/34

(Continued)

FOREIGN PATENT DOCUMENTS

JP    61-130904 A    6/1986

(Continued)

OTHER PUBLICATIONS

Skata et al., Lensed Plastic Optical Fiber Employing Concave End Filled with High-Index Resin, Apr. 2002, Journal of Lightwave Technology, vol. 20, No. 4, pp. 638-642.*
Breinig, Mariane, Optical Wave Guides, 2000, University of Tennessee, http://electron9.phys.utk.edu/optics421/modules/m9/Optical%20Wave%20Guides.htm, pp. 5-6.*
Khoe et al., Trends in Electro-Optical Communication Systems, 1999, Astron, pp. 285-294.*

*Primary Examiner*—Frank G Font
*Assistant Examiner*—Erin D Chiem
(74) *Attorney, Agent, or Firm*—Sughrue Mion, PLLC

(57) ABSTRACT

A POF includes an inner core having a refractive index distribution and an outer core provided on periphery of the inner core. A ratio Ra/Rb of an outer diameter of the inner core to the outer core satisfies $0.67 \leq (Ra/Rb) \leq 0.87$ such that an outgoing beam from an end of the POF may have a parallel area of at least 200 μm. Thus a space between the end for exiting the exit light and a light receiving device can be kept at least 200 mm without members or devices for collimating.

14 Claims, 16 Drawing Sheets

U.S. PATENT DOCUMENTS

| | | | | |
|---|---|---|---|---|
| 5,477,323 A | * | 12/1995 | Andrews et al. | 356/477 |
| 5,541,247 A | | 7/1996 | Koike | |
| 5,940,567 A | * | 8/1999 | Garito | 385/127 |
| 6,078,715 A | * | 6/2000 | Fujii et al. | 385/127 |
| 6,157,757 A | | 12/2000 | Giaretta et al. | |
| 6,671,432 B2 | * | 12/2003 | Imada et al. | 385/33 |
| 2002/0009276 A1 | * | 1/2002 | Sugiyama et al. | 385/124 |

FOREIGN PATENT DOCUMENTS

| | | |
|---|---|---|
| JP | 8-21929 A | 1/1996 |
| JP | 8-75935 A | 3/1996 |
| JP | 2000-147294 A | 5/2000 |
| JP | 2000-241649 A | 9/2000 |
| JP | 2001-133651 A | 5/2001 |
| JP | 2001-264592 A | 9/2001 |
| JP | 3332922 B2 | 7/2002 |

* cited by examiner

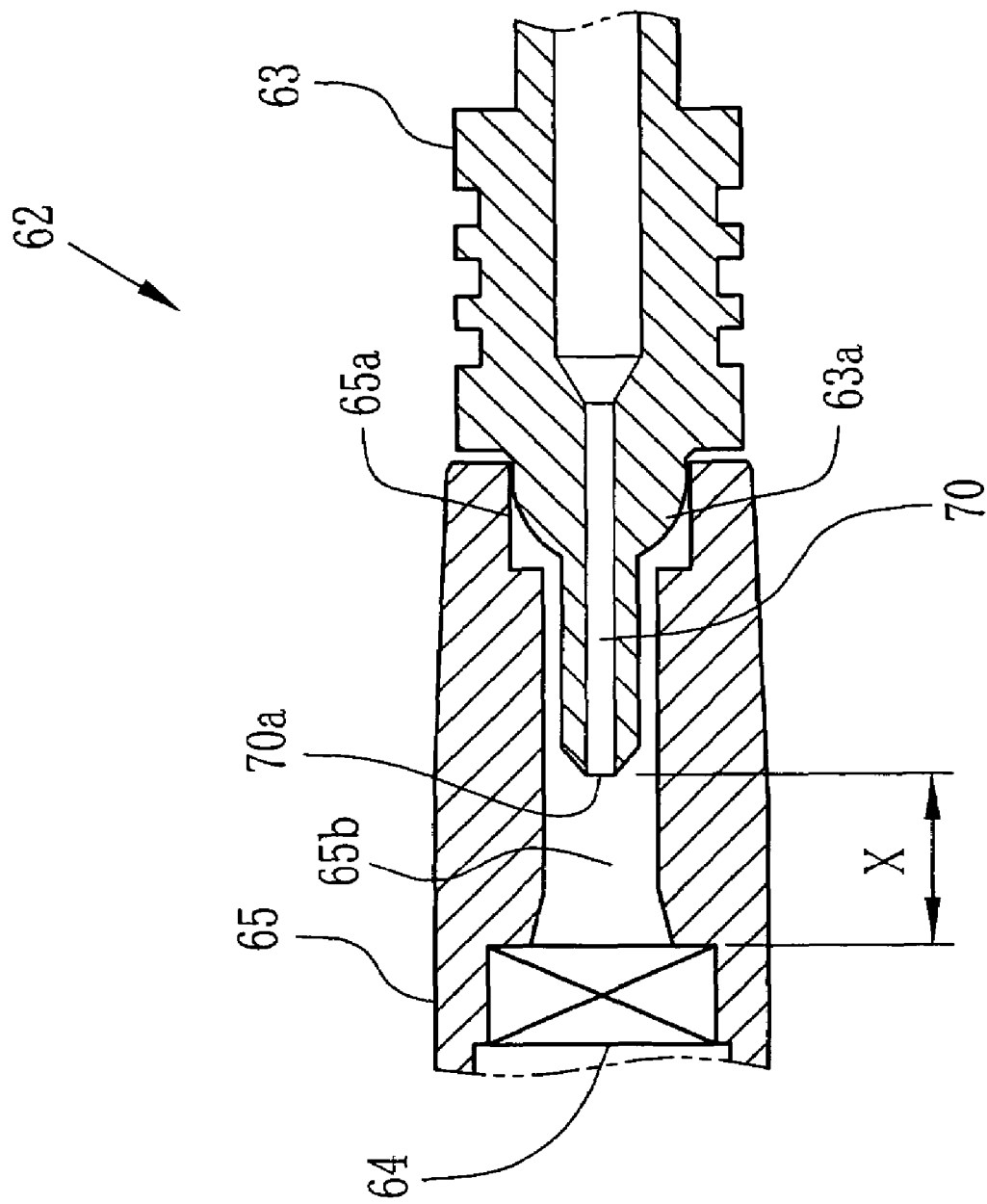

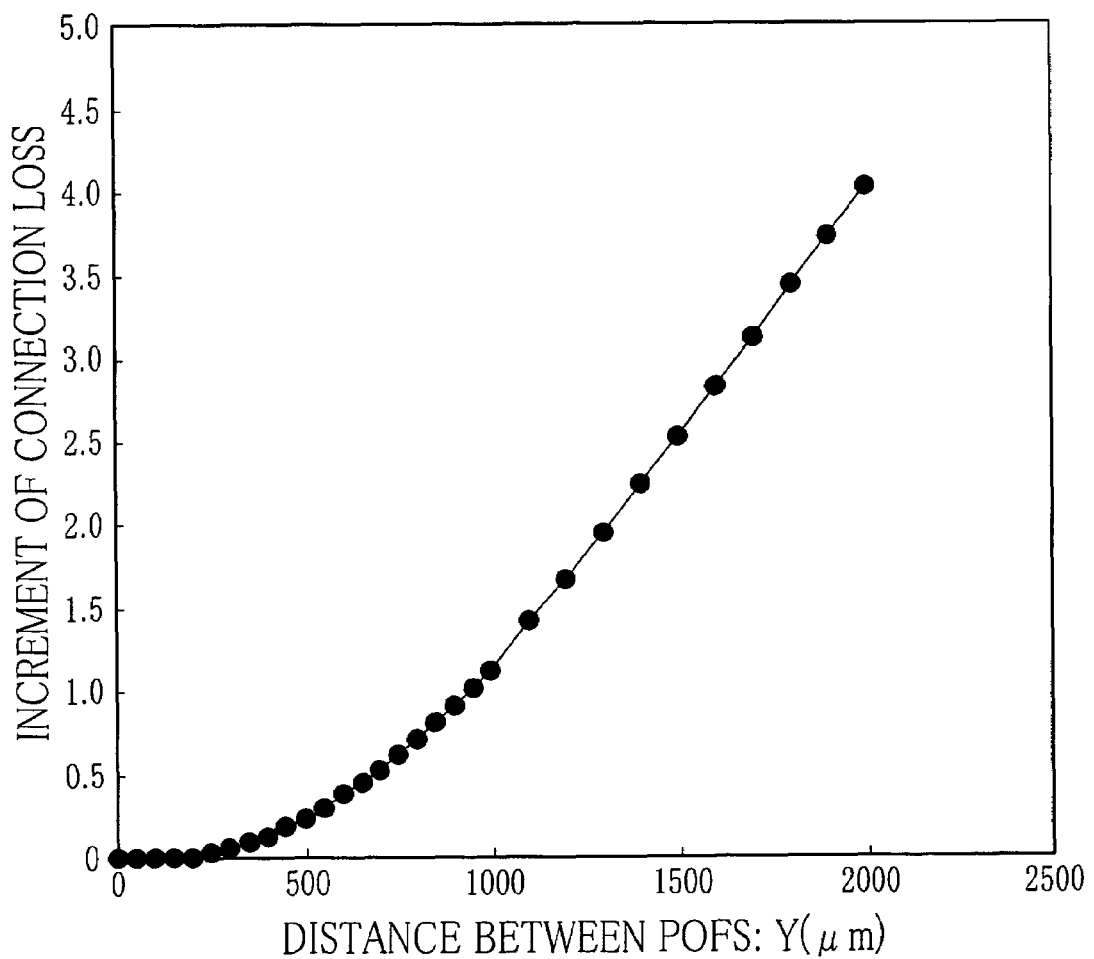

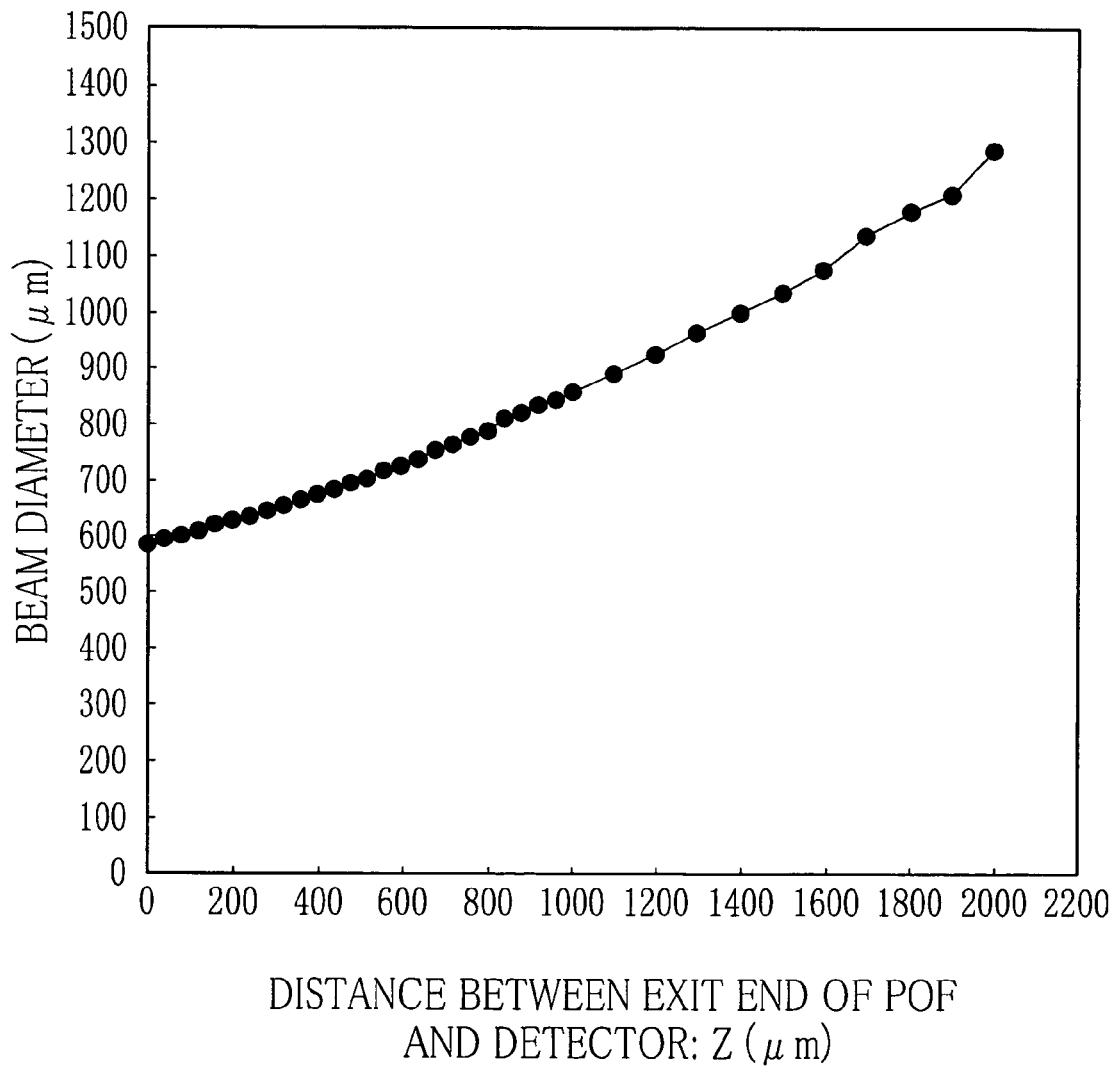

EXPANSION CHARACTERISTICS
OF EXIT BEAM FROM $\phi$ 125 $\mu$m-GI-POF

DISTANCE BETWEEN EXIT END OF POF
AND DETECTOR: Z ($\mu$m)

PREFORM FOR PLASTIC OPTICAL MATERIAL, PRODUCTION METHOD THEREOF, OPTICAL COUPLING METHOD OF PLASTIC OPTICAL FIBER AND CONNECTOR USED FOR OPTICAL COUPLING

BACKGROUND OF THE INVENTION

1. Field of the Invention

The present invention relates to a preform for a plastic optical material, a producing method thereof, an optical coupling method of a plastic optical fiber used in an optical networking and the like, and a connector used for the optical coupling.

2. Description Related to the Prior Art

As having merits in easiness of processing and production, low price and the like, plastic optical member, compared with an optical member of quartz having the same structure, is recently utilized for several members, such as an optical fiber, an optical lens, an optical waveguide and the like. Especially the plastic optical fiber among these members is entirely made of plastic. Therefore the plastic optical fiber has merits in adequate flexibility, smaller weight and more easy treatment and production as the optical fiber having large diameter, and the lower production cost than the quartz optical fiber, although having demerit in larger transmission loss than the optical member of quartz. In Japanese Patent Laid-Open Publication No. S61-130904, it is planned to use several sorts of the plastic optical fibers as transmitting mediums for such a short distance transmission that the transmission loss is not so large to an influence on the transmission.

The plastic optical fiber is constructed of a core whose main component is organic compounds in which polymer molecules are arranged in matrix, a clad composed of organic materials having different refractivity from the core. (The clad usually has a low refractive index). Especially, there is a plastic optical fiber of refractive index distribution type in which the core has refractive index distribution from the center toward the outside. In this structure, the band for transmission of the optical signal is able to be made larger. Therefore, this type of the plastic optical fiber has high transmission capacity and attracts attention to use for the high transmission. Several methods of producing the optical member of the refractive index distribution type are proposed, and for example in Japanese Patent Publication No. 3332922, there is a method in which interfacial gel polymerization is made to form a preform, and the preform is drawn to produce the graded index plastic optical fiber (hereinafter, GI-POF).

In the interfacial gel polymerization, polymerizable compounds are supplied into an inside of a tube so as to melt or swell an inner surface of the tube. In this situation, the interface between the polymerizable compounds and the inner wall of the tube swells to have a swollen phase. Then the polymerization proceeds in the gel effects from the inner wall gradually. Thereby when the polymerizable compounds contain a dopant having a large molecular volume, the content of the dopant in the central portion becomes large. Thus the preform is produced so as to have a portion having a continuous refractive index distribution in section.

The preform having the above refractive index distribution can be used as a perform for other optical members (for example GRIN (Graded-Index) lens) if the drawing is not made but the processing, such as the cutting. Therefore the serviceability of the preform is large.

In a method of forming the preform, for example, a clad tube is prepared, and polymerizable monomers (including pre-polymerized compounds) are supplied into an inner space of the clad tube for forming a light guide portion. In this case, there are some combinations of the clad and the core, which makes a clad/core interface irregularity and the lower performance of the preform. Therefore an intermittent layer is provided.

FIGS. 14A-14D illustrate the procedure of forming the preform provided with the intermittent layer. A clad tube 150 is formed of polymer and has a length L11, and polymerizable compounds (outer core liquid) whose main component is the polymerizable monomers (including the pre-polymerized compounds) are supplied in an inner space of the clad tube 150. Then the polymerization is made with rotation of the clad tube 150 (this polymerization is called rotating polymerization), so as to form in the clad tube 150 an outer core portion 152 made of the polymers of the polymerizable monomers. The outer core portion 152 has an inner space of a diameter D11, and becomes an outer core of the POF. Further, the clad tube 150 is provided with a stopper 151 to stop an end thereof, and then polymerizable compounds as an inner core liquid 153 for forming an inner core is supplied into the inner space of the outer core portion 152. The inner core liquid 153 contains monomers as a main content, polymerization initiator, chain transfer agent, refractive index modifier and the like. When the clad tube 150 is heated or disposed in an illumination of light, the polymerization of the monomers in the inner core liquid 153 starts. Thus a inner core portion whose main content is polymer is formed. As shown in FIG. 14B, in the polymerization of the monomers, the contraction in volume of the inner core liquid 153 occurs, and the solvent in the inner core liquids 153 is evaporated to be gasses 154. Thereby parts of the generated gasses 154 (gas compounds) are remaining dissolved in the inner core liquids 153. Then in the procedure of the polymerization with decreasing the volumes, as shown in FIG. 14C, an upper surface of the inner core liquid 153 forms a V-shaped retraction (or V-contraction). Then, as shown in FIG. 14D, the polymerization of the inner core liquid 153 is complete to form the inner core portion 155. Thus the preform 156 is obtained, and the inner core portion 155 forms an inner core of the POF.

However, in the methods in FIGS. 14A-14D, the contraction in volume occurs in the polymerization. In this case, it is necessary to determine a thickness of the outer core portion 152 formed on an inner face of the clad tube 150, an outer diameter and a thickness of the clad tube 150, such that the diameter D11 may have enough largeness for forming the inner core portion 155. If the diameter D11 is too small, the evaporation for generating the gasses 154 is not enough made, and the formed preform 156 sometimes contains the gas compounds of the gasses 154 in the inner core 155. If the diameter D11 is too large, the evaporation is not made from a liquid surface enough, the polymerization reaction of the inner core liquid 153 cannot be made uniformly. Otherwise, the viscosity of the inner core liquid 153 increases in the polymerization. In this case, if the length L11 of the clad pipe 150 is too large, the gasses 154 generated in a lower side is contained in and cannot escape from the inner core liquid 153. Thus the inner core portion 155 is formed with containing the gasses 154 to causes voids therein.

Further, the preform is drawn with melting to form the POF. Thereby, the voids are generated in the melt polymer so as to remain in the POF as the products, even though the voids are not visible after the polymerization to form the inner core portion 155. At the portion of the void, the optical transmission properties become worse, and therefore the productivity becomes lower.

One of characteristics of the plastic optical fiber (hereinafter POF) is a larger diameter than the quartz optical fiber as above, and the POF can be easily connected to a light source, such as a light emitting diode (LED), a laser diode (LD), a vertical cavity surface emitting laser (VCSEL) and the like. Recently, the production of the POF of the refractive index distribution type became possible, and it is required to use the POF of this type as a transmission path of a transmission link for transmitting optical signals in a broadband of at least 1 Gbps (100 m). In the transmission link (1 Gbps (100 m)) of this case, the superiority in the optical coupling of the light source to the POF of the large diameter is the same as to the quartz optical fiber. However, in the optical coupling of the POF of the large diameter to a light receiving device (for example photodiode) for receiving an exit light from the POF, in order to make the good optical coupling for the transmission link (1 Gbps (100 m)), a condensing device (such as an optical lens and the like) is disposed in a space between the POF and the light receiving device. The reason therefor is that the exit light from the POF of the large diameter extends in effect of the diffraction to more than a diameter of an aperture of a light receiving device.

Also a connector for connecting the POFs in the transmission link of optical signals has the same problem. The connector for the POFs is designed, in consideration of elongation of the POFs in the change of the temperature, such that there may be a space about few hundreds micrometers between the connected POFs. Therefore, the exit light from the POF extends in the diffraction to have a beam diameter equal to or more than a fiber diameter (or aperture diameter) of the next POF. Thus when the exit light enters into the next POF, the optical coupling loss (diffraction loss) occurs. Accordingly, in order to make the optical coupling of good efficiency also in the connector for the POFs, it is necessary to dispose the condensing device (relay lens and the like) in the connector. In the case of connecting the quarts fibers, their ends are physically contacted to each other, and therefore, there are no problems as described above.

Further, in the transmission link for higher-bandwidth with use of the POFs, attentions to a system for multi-wavelength optical transmission became larger, in which it is necessary to dispose an optically functional element (such as a wavelength filter and the like) between the transmission paths for separating the signals of multiplied wavelength. However, if the space for disposing the optically functional element without condensing function on the transmission path, the diffraction loss occurs and a coupling efficiency of the optical coupling becomes lower. In order to prevent the decrease of the coupling efficiency, an optical collimator constructed of lenses is disposed between the transmission path.

As described above, the condensing device is usually used in the transmission link of optical signal with use of the POF, in order to decrease the diffraction loss, or to improve the coupling efficiency. Further, the condensing device is more important when the quartz optical fiber is used than when the POF is used as the transmission path of the transmitting link for optical signal. When the POF is used, therefore, in order that the light receiving device effectively receives the optical power, the structure, design and the like of the condensing device is more important than when the quartz optical fiber is used.

In the prior art, as the condensing device disposed between the optical fiber and the light receiving device, there are concretely a lens described in Japanese Patent Laid-Open Publication No. 2000-147294, a graded-index lens (or GRIN lens) described in Japanese Patent Laid-Open Publication No. 2001-264592, and the like. Further, in a condensing device of Japanese Patent Laid-Open Publications No. 8-21929 & 8-75935, an end of the POF may be processed to have a curved surface (such as spherical surface) or a taper-form. In these cases, since the condensing of the emitted light from the POF can be made, the focused light can be received by the light receiving device, and thus the optical coupling efficiency becomes larger.

However, in the methods of the above four publications, it is necessary to accurately decide a position of the condensing device (for example, condensing length of the lens and the like) which condenses a transmission light to an emission axis of the optical fiber. Accordingly, the number of parts for the optical coupling is increased, and the alignment between the POF, the optical lens and the light receiving device is necessary. Therefore the cost of the link system for optical transmission becomes higher.

Further, if there is an optical element such as a lens between the POF and the light receiving element, the cost becomes higher and a Fresnel loss occurs such that the power of the transmission light becomes lower. Accordingly, it is necessary to make the optical coupling in which the smaller number of the optical elements is disposed. Further, the exit end face may contact directly to light receiving element. However, in this case, it is hard to make the optical coupling in the simple structure, since the light receiving elements or the exit end face thereof is broken by forcedly pressing to the light receiving element. Therefore, it is necessary to design the positional relation between the exit end and the receiving device and to fix them concretely, and the easy optical coupling cannot be made.

SUMMARY OF THE INVENTION

An object of the present invention is to provide an optically coupling method in which the optical coupling efficiency increases without a condensing device.

Another object of the present invention is to provide a connector in which the optical coupling efficiency increases without a condensing device.

Still another object of the present invention is to provide a plastic optical preform and a production method thereof in which the voids don't remain even though the contraction in volume decreases.

In order to achieve the object and the other object, in an optical coupling method of the present invention, an exit end of a first graded-index optical fiber is confronted to an incident end of a second graded-index optical fiber or a light-receiving device, and a gap is formed between the exit end and the incident end. The gap is at least 200 μm.

In a preferable embodiment, optically functional elements for separately picking up multiwavelength signals are disposed in the gap. Further, each of optical fiber has an inner core having a refractive index distrubution and an outer core surrounding the inner core and having a substantially constant refractive index. A light propagates in the inner and outer cores. A coefficient of the refractive index distribution is in the range of 1.5 to 4.0. Preferably, an outer diameter of the outer core is in the range of 250 μm to 1000 μm. A ratio of a diameter of the inner core to the outer diameter is in the range of 0.67 to 0.87.

In a preferable embodiment of the optical coupling method, an exit NA of the optical fiber is in the range of 0.12 to 0.22. Further, a light emitting device having an exit NA in the range of 0.05 to .22 is used as a light source for generating a light incident into the optical fiber. The light emitting device is a vertical cavity surface emitting laser.

In a connector for making an optical coupling of the present invention, first graded-index plastic optical fiber is coupled to a second graded-index plastic optical fiber or a light-receiving device. The connector comprising a first hold member for holding the first optical fiber and a second hold member for holding the second optical fiber or the light-receiving device. The connector further includes a connecting member provided with at least one of the first and second hold members for connecting the first and second connecting members. When the connection is made, an exit end of the first optical fiber confronts to an incident end of the second optical fiber or the light-receiving device at a distance at least 200 μm.

In a preferable embodiment of the connector, an optically functional elements for separately picking up multiwavelength signals is disposed between the exit end and the incident end.

A preform for a plastic optical member of the present invention has a rod portion having a continuously changing refractive index and a cylindrical portion surrounding said rod portion. A diameter D (mm) of the rod portion and a thickness t (mm) of the cylindrical portion satisfy a condition of $2 \leq (D/t)$.

Preferably, when a length of the cylindrical portion L, a condition, $4 \leq (D/t) \leq 100$, is satisfied. Further, the refractive index of the rod portion continuously decreases from a center toward an outside. The rod portion is an inner core portion and the cylindrical portion is an outer core portion. The preform further comprises a clad portion which surrounds the outer core portion. The preform is drawn to produce a plastic optical fiber.

In the present invention, in a producing method of a preform for a plastic optical member that has a rod portion having a continuously changing refractive index and a cylindrical portion surrounding the rod portion, polymerizable compounds are supplied in the cylindrical portion. The polymerizable compounds are polymerized to form the rod portion in the cylindrical portion such that a thickness t of the cylindrical portion and a diameter D of the rod portion may satisfy a condition, $2 \leq (D/t)$.

In a preferable embodiment of the producing method of the present invention, the rod portion is formed by an interfacial gel polymerization, in which a percentage of decrease in volume of the polymerizable materials is at most 25%. Furthermore, the preform is drawn to produce a plastic optical fiber.

According to the optical coupling method and the connector of the present invention, an exit light from the exit end of the graded-index plastic optical fiber propagates as a parallel light beam for a long distance. Therefore a device for condensing or collimating the exit light is not necessary. Thus the number of parts for the optical coupling becomes smaller, and the process for positioning the parts for the optical coupling becomes simpler. Consequently, the cost for the link system for optical transmission becomes lower. Further, even if a wavelength filter is disposed between the optical fiber and an active optical device (such as the light-receiving device), the diffraction loss can become lower.

The preform for the plastic optical member of the present invention is provided with the rod portion whose refractive index continuously changes and the cylindrical portion on the periphery of the rod portion. Further, the diameter D (mm) of the rod portion and the thickness t (mm) of the cylindrical portion satisfy a condition, $2 \leq (D/t)$. Accordingly, it is reduced that the preform contains gases generating in the formation of the rod portion. Note that this effect becomes larger if the diameter D (mm) of the rod portion is in the range of 5 mm $\leq$ D (mm) $\leq$ 50 mm.

If the length of longer one between the rod and cylindrical portions has the length is L (mm), a condition, $4 \leq (L/D) \leq 100$, is satisfied. Therefore it is prevented that the rod portion contains the gasses generating in a lower area in the cylindrical portion during the formation of the rod portion. Further, the preform of the present invention can be preferably applied for the GI-plastic optical fiber in which the refractive index is at the most at the center of the rod portion and decreases from the center toward the outside.

BRIEF DESCRIPTION OF THE DRAWINGS

The above objects and advantages of the present invention will become easily understood by one of ordinary skill in the art when the following detailed description would be read in connection with the accompanying drawings.

FIG. 6 is a sectional view of a connector of the present invention;

FIG. 13 is a graph illustrating a coupling efficiency to a distance between two POFs in the optical coupling thereof;

FIG. 15, 16 are graphs illustrating the variation of the beam diameter to an exit end of the POF in the prior art.

PREFERRED EMBODIMENTS OF THE INVENTION

Figure 1:
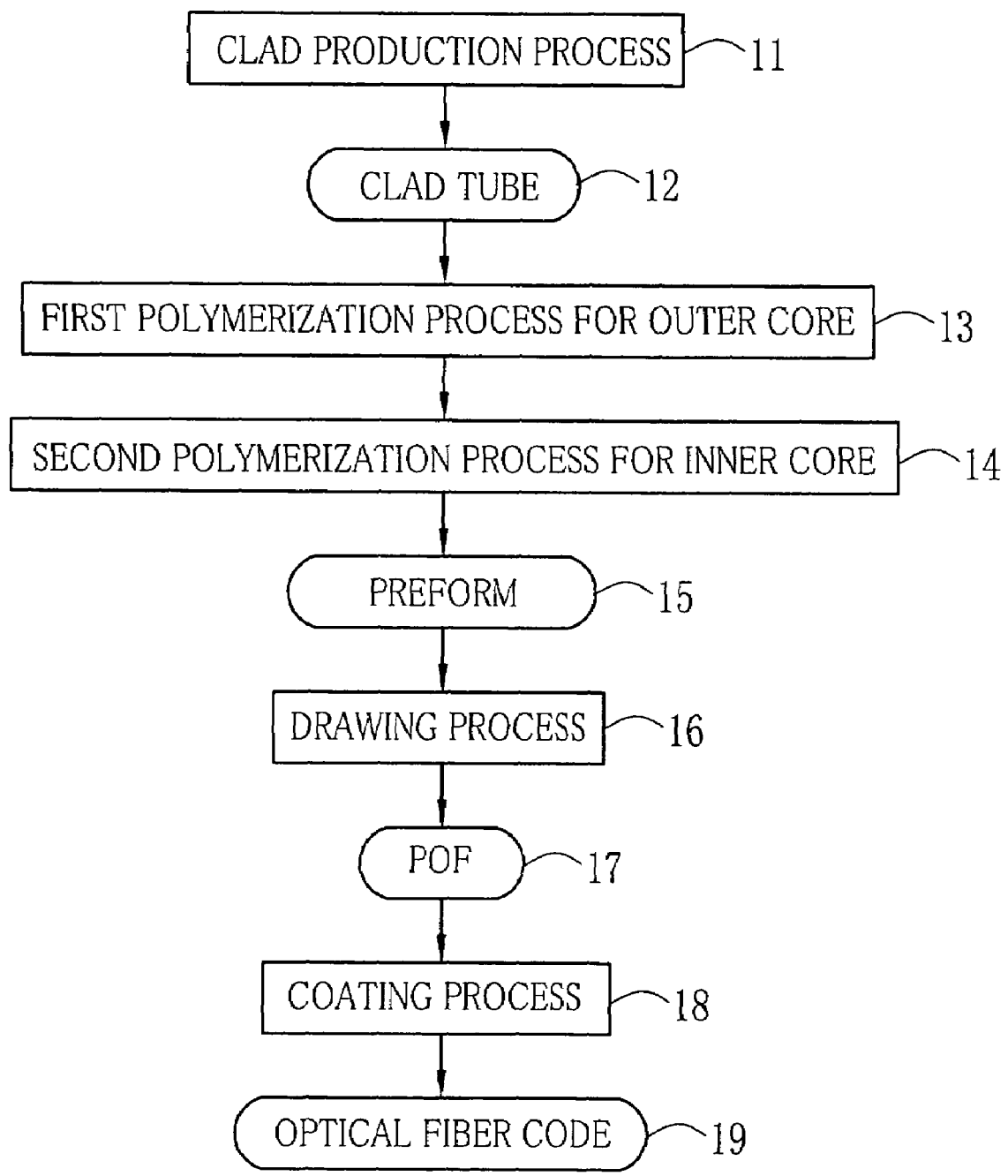
FIG. 1 is a flow chart of forming a preform for a POF of the present invention.

In FIG. 6, a connector 62 has a hold member 63 for holding a Graded-Index plastic optical fiber (hereinafter POF) 17 and a hold member 65 for holding a light-receiving device 64. On a front end of the hold member 63, an exit end 70a of the POF 17 is exposed. In the hold member 63 is formed a connecting portion 63a to have a convex shape and in the hold member 65 a connecting portion 65a to have a concave shape. The connecting portions 63a, 65a are made from resilient materials, such as resins and the like. The hold member 63 is inserted into the hold member 65 such that the exit end 70a may enter into a space 65b of the hold member 65 and the connecting portion 63a may fit into the connecting portion 65a. Thus the hold members 63, 65 are connected. Thereby the exit end 70a confronts to the light-receiving device 64, and the distance X between them may be around 300 μm. The distance X may be set in the range of 150 μm to 500 μm, and preferably 200 μm to 400 μm. Note that these ranges are determined when the space 65b is filled with an air. However, the space 65b may be filled with materials having no converging functions, and the distance X is determined thereby to be shorter proportionally to the refractive index in the space 65b. Note that the light receiving device 64 is a light receiving elements, for example, PIN photodiode and the like.

Further, when the hold members 63,65 are connected, optically functional elements having no converging functions may be provided for at least one of the hold members 63,65 between them.

The opening diameter of photodiodes (PD) as the light-receiving elements is preferably determined in the range of 300 μm to 400 μm for transmission at 1 Gbps, and to about 100 μm for transmission at 3 Gbps, in consideration of balance between a light-receiving area and an operation performance. Note that it is sometimes necessary to use the photodiodes having the small light-receiving area on account of the high speed transmission, decrease a diameter of the POF, or the like. In this case, avalanche photodiodes whose sensibility is increased can be used to cover the demerit of the small light-receiving area. Further, in the optical coupling of the present invention, it is not necessary to strictly set an optical axis. Therefore the adequate optical coupling is made enough even in the passive alignment, and excellent for the mass production. Especially when the diameter of the exit light is smaller than the light receiving area of the light-receiving element, a light intensity can be kept even in the misalignment. Accordingly, the present invention becomes more effective.

Figure 17:
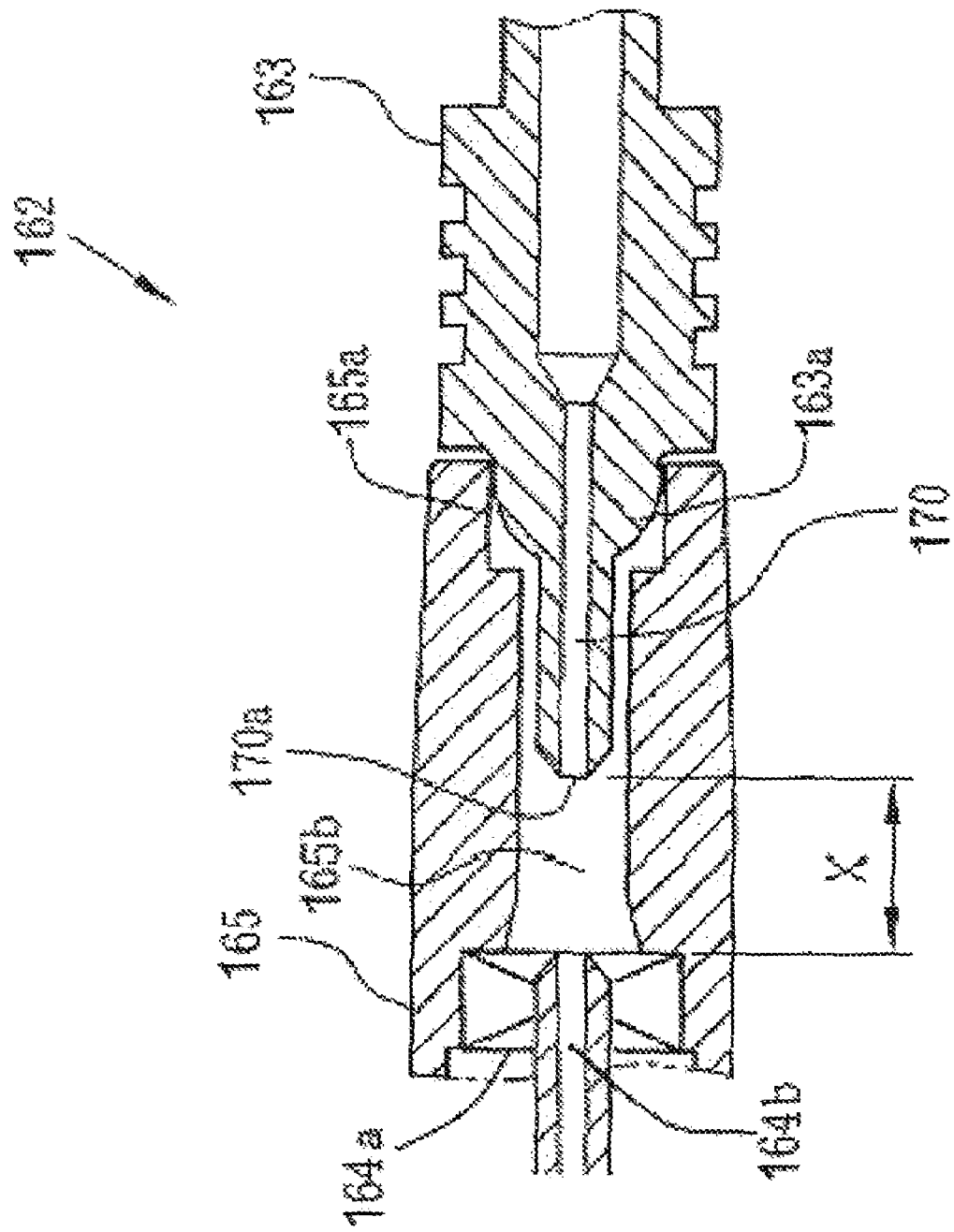
FIG. 17 is a sectional view of a connector of the present invention.

In FIG.17, a connector 162 has a hold member 163 for holding a Graded-Index POF 170 and a hold member 165 and 164a for holding a second Graded-Index POF 164b. On a front end of the hold member 163, an exit end 170a of the POF 170 is exposed. In the hold member 163 is formed a connecting portion 163a to have a convex shape and in the hold member 165 a connecting portion 165a to have a concave shape. The connecting portions 163a, 165a are made from resilient materials, such as resins and the like. The hold member 163 is inserted into the hold member 165 such that the exit end 170a may enter into a space 165b of the hold member 165 and the connecting portion 163a may fit into the connecting portion 165a. Thus the hold members 163,165 are connected. Thereby the exit end 170a confronts to the second Graded-Index POF 164b, and the distance X between them may be around 300μm. The distance X may be set in the range of 150μm to 500μm, and preferably 200μm to 400μm. Note that these ranges are determined when the space 165b is filled with an air. However, the space 165b may be filled with materials having no converging functions, and the distance X is determined thereby to be shorter proportionally to the refractive index in the space 165b.

Further, when the hold members 163,165 are connected, optically functional elements having no converging functions may be provided for at least one of the hold members 163,165 between them.

Figure 7:
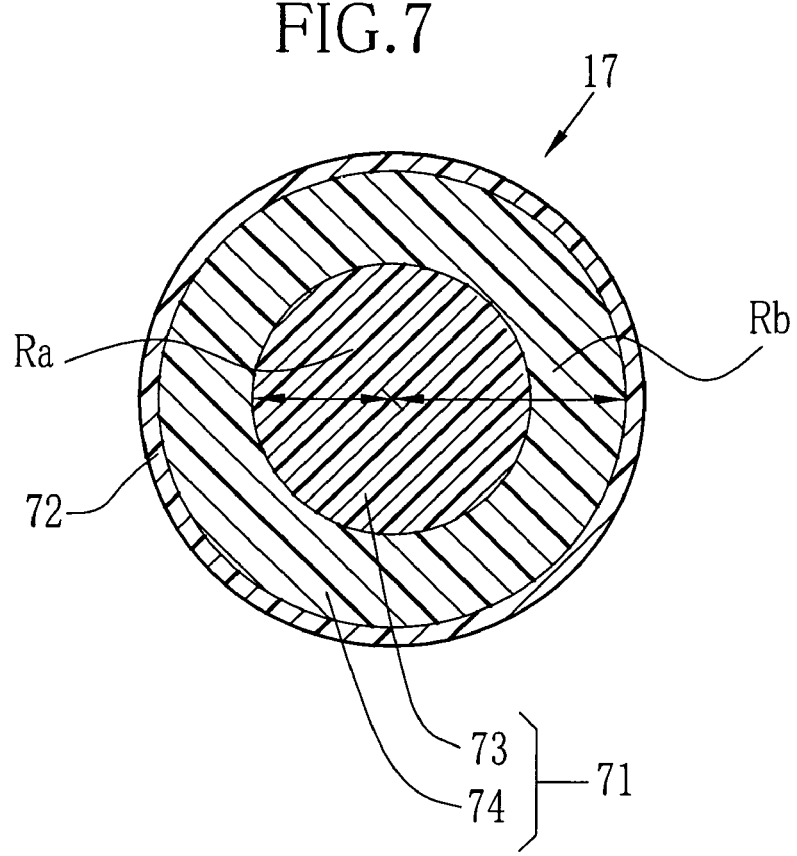
FIG. 7 is a sectional view of a POF.

In followings, the Graded-Index plastic optical fiber is explained, which is used in the optically coupling method and the connector of the present invention. In FIG. 7, the POF 17 is formed by drawing a preform 15 of FIG. 2A, and includes a core 71 as an inside and a clad 72 covering a periphery of the core 71. The core 71 has an inner core 73 in a middle area and an outer core 74 covering a periphery the inner core 73. Note that the clad 72, the inner core 73 and the outer core 74 correspond to a clad portion 12, an inner core portion 25 and an outer core portion 26 in the preform 15 in FIG. 2A. A radius of the inner core 73 is named an inner core radius Ra, and a radius of the outer core 74 is named an outer core radius Rb. The optical fiber of this structure has a high transmission capability since the inner core 73 has a refractive index distribution. When the refractive index distribution is square distribution, the transmission capability becomes at the highest.

Figure 8:
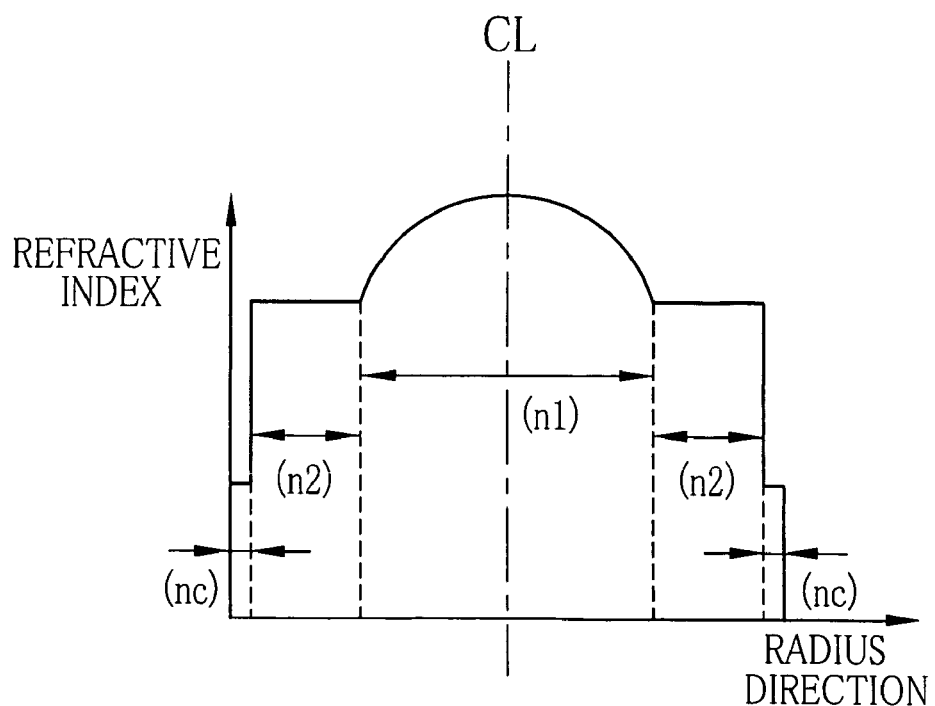
FIG. 8 is an explanatory view illustrating a change of the refractive index.

As shown in FIG. 8, the refractive index n1 of the inner core 73 continuously decreases from the central axis CL to the periphery, which shows the refractive index distribution as g-power distribution of the Graded-Index plastic optical fiber. Note that in order to obtain the POF 17 the drawing of the preform 15 (FIG. 2A) is made such that the graph of the refractive index distribution of the POF 17 may be analogicus to that of the preform 15.

The refractive index n2 of the outer core 74 is constant and almost the same as that of the periphery of the inner core 73. Note that, although the refractive index n2 of the outer core 74 is preferably constant, the outer core may have the refractive index distribution for the propagation in high-order mode. Further, a refractive index nc of the clad is smaller than the refractive index n2 of the outer core 74.

As described above, the refractive index n1 of the inner core 73 has the g-power distribution in the radius direction. The value g is called a coefficient of the refractive index distribution, which determines the shape of the refractive index distribution of the POF of the present invention when the approximation is made after the power-law represented as the approximation formula of the refractive index distribution. In the formula, Ra is a radius of the inner core, Mn1 is a maximum of the refractive index on the center of the inner core, n2 is a minimum of the refractive index on the periphery of the inner core (or the refractive index of the outer core 74), Δ is a value calculated by dividing a difference from Mn1 to n2 by Mn1. The refractive index n1(r) at an optional position far from a distance r from a center of the inner core is defined as the following formula (1).

$$n1(r)=Mn1(1-2\Delta(r/Ra)^g)^{1/2} \text{ (note, } \Delta=(Mn1-n2)/Mn1)  \quad (1)$$

The radius ratio of the inner to the outer core, (thel radius of the inner core)/(the outer radius of the outer core), is from 0.67 to 0.87, preferably 0.67 to 0.80. When the radius ratio is too large, the diameter of parallel beam becomes large, which is not preferable. When the radius ratio is too small, the convergence of the light cannot be made. The outer radius of the outer core (or the radius of the core in which the light passes) is from 250 μm to 1000 μm, and preferably from 300 μm to 750 μm. When the outer radius of the outer core is too large, the outer diameter of parallel beam becomes large, which is not preferable. When the outer radius is too small, the light cannot enter into the POF, which is not preferably.

The inner core 73 is formed such that the coefficient g of the refractive index distribution may satisfy a condition, $1.5 \leq g \leq 4.0$, and preferably $1.5 \leq g \leq 2.5$. If the coefficient is too large, a mode delay occurs, and therefore the transmission characteristics becomes worse.

As described above, since the optical fiber of the above ratio of the first inner core to the second inner core is used, an outgoing beam has a parallel area. Thus the parallel area of the out going beam becomes larger and wider. Therefore the members and devices for collimating and concentrating are not necessary.

Figure 12:
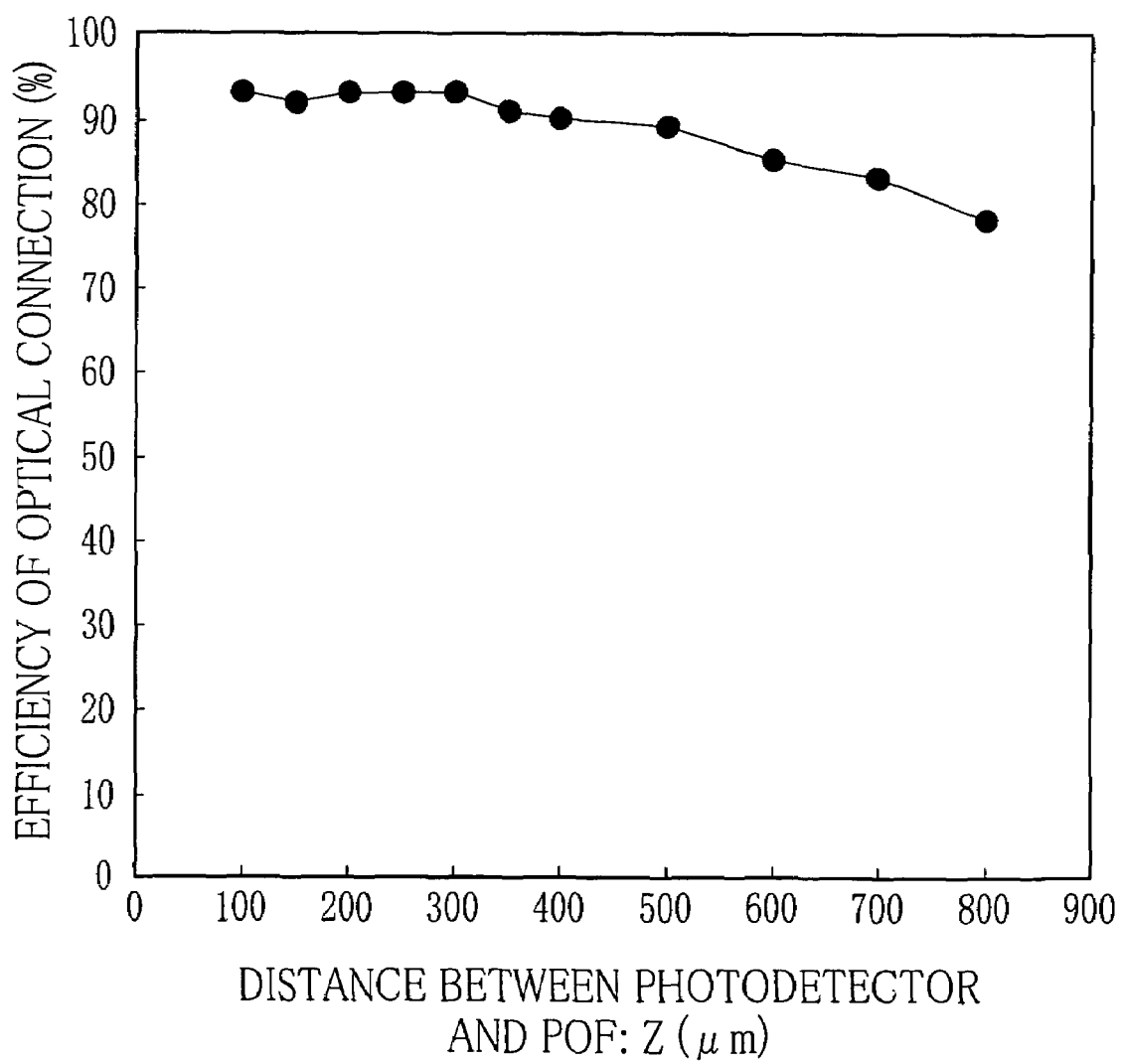
FIG. 12 is a graph illustrating a coupling efficiency to a distance between the POF and a photodetector in an optical coupling thereof.
Figure 14A:
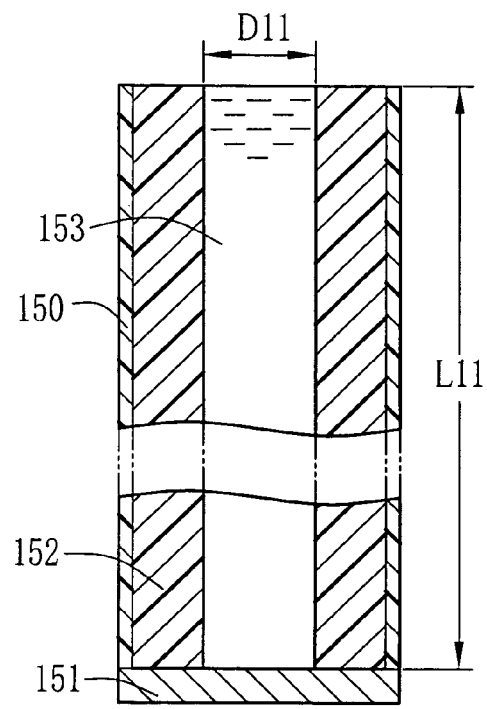
FIGS. 14A-14D are vertical sectional views illustrating for forming a preform in prior art.
Figure 14B:
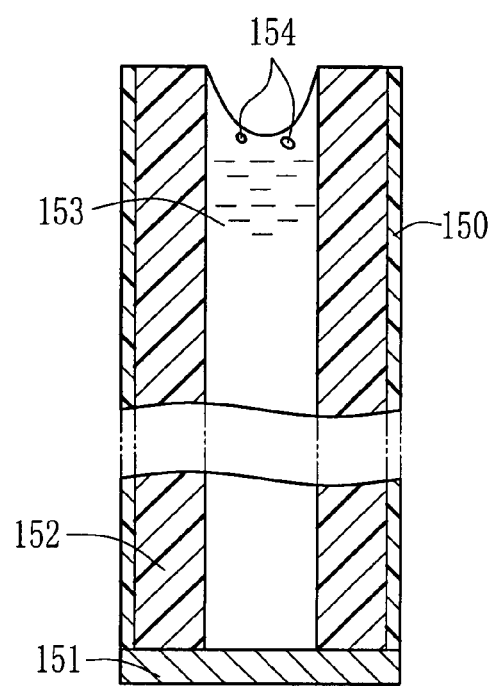
Figure 14C:
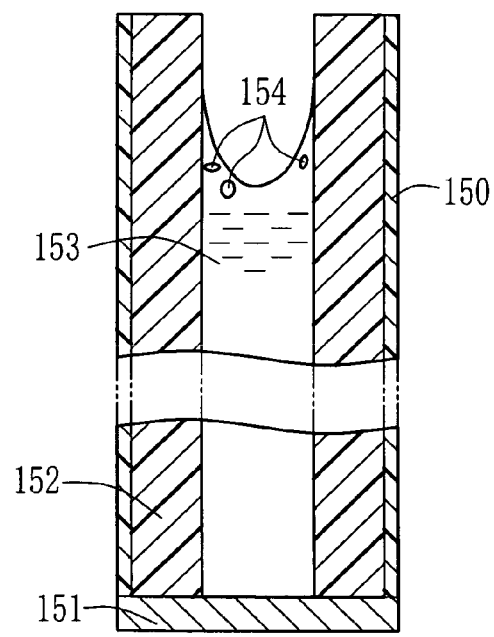
Figure 14D:
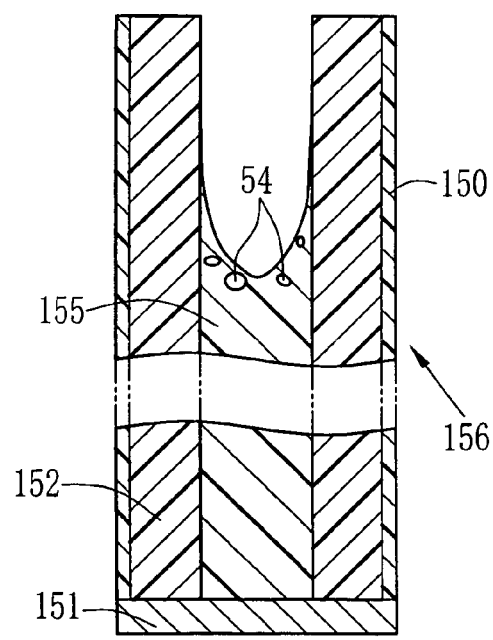

As shown in FIGS. 12&13, the diffraction loss doesn't occur when the POF is optically coupled to a light receiving device (or a photodiode (PD)), or the another POF at a distance of at most 300 μm. Therefore, a device for condensing or collimating is not necessary. Further, in principle, the optical device such as the wavelength filter can be disposed in the space between the POF and the light receiving device or the another POF.

The quartz optical fiber and the POF of the prior art don't have such characteristics. Further, when the POFs of the present invention are connected with use of the connector, the optical coupling with a low coupling loss can be made even without physically contacting the ends of the POFs as in case of connecting the quartz optical fibers with use of a single-mode quartz fiber connector in the prior art. Further, the optical coupling with low connection loss can be made, even though it is not necessary to strictly determine the space for the expansion and the contraction of the optical fiber as the connector for the POF in the prior art. Therefore, the connector housing structure can be planed at a low coupling loss and a low cost.

As described above, in the POF of the present invention, the large diameter and the receivable angle of the prior art is kept, and the exit beam propagates to form a parallel beam in a distance. Therefore the POF of the present invention has the same character as the optical fiber having the small diameter, which can be connected to the receiver of the small diameter for the high-band light receiving device having small aperture. Accordingly, in the optical coupling of the present invention, since the high accuracy is not required in the positioning process of parts, the positioning process can be simplified so as to reduce the optical transmission link system.

Further, the exit beam from the POF 17 having above structure propagates for a predetermined length (about 300 µm) to form a parallel beam, and thereafter expands at a predetermined expanding angle. Accordingly, in the propagating range of the above parallel beam, the coupling efficiency to the light receiving device having a larger hole diameter than the parallel beam becomes about 100% even if the condensing optical device (such as the optical lens and the like) is not used. Further, since the condensing optical device is not used, the number of parts in the optical coupling becomes smaller, and the positioning process of the parts for the optical coupling can be simplified. Accordingly, the cost for optical transmission link becomes lower. Further, a space for disposing the optical functional elements having other functions than collimating can be kept.

As in the above embodiment, in the POF having the first core and the second core, the generation of the voids which causes the scattering in the core is prevented. Such POFs can be obtained in several manners. In followings, a production method of a preform to be used for obtaining the POF will be described.

In FIG. 1, a cylindrical clad tube 12 is formed in a clad production process 11. As described below, the clad tube 12 may be formed by a method in which the polymerizable compounds may be polymerized similarly to the formation of an outer core portion, or by a method in which the melt-extrusion of the resins prepared by the polymerization is made. Then the outer core liquid is prepared, and in a first polymerization process 13, the outer core portion is formed in a hollow part of the clad tube 12. Before forming the outer core portion, in order to prevent the contact of the neighboring clad tubes or the increase of the workability at the polymerization, a buffer layer may be provided on a periphery of the clad tube 12. Further, in a second polymerization process 14, another polymerization is made to form an inner core portion. Thus the preform 15 for an optical material is obtained. In order to form the inner core portion, the same as the outer core portion, an axis of the clad tube 12 can be horizontally set and the clad tube 12 can be rotated to perform the polymerization.

The obtained preform is processed to produce several optical members, such as an optical fiber, a lens and the like. In followings, the explanation is made for the case when the preform is used for producing the POF. The preform 15 is drawn with melting in a drawing process 16 so as to form the POF 17. The POF 17 can be used without further processing or treatment. However, for easiness of the treatment or prevention of the damage of the surface, it is preferable to form a protective layer in a coating process 18. Thus a plastic optical code 19 is obtained, and includes the protective layer and the POF 17 covered with the protective layer. Further, an end face treatment and a connection jig (or a connector) may be provided.

Figure 2A:
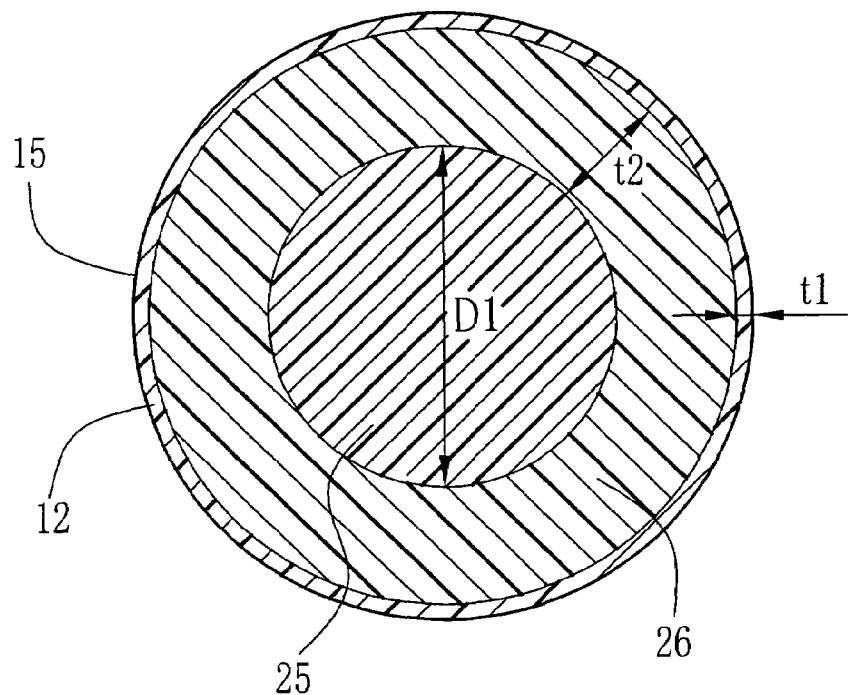
FIG. 2A is a cross-sectional view of the preform.
Figure 2B:
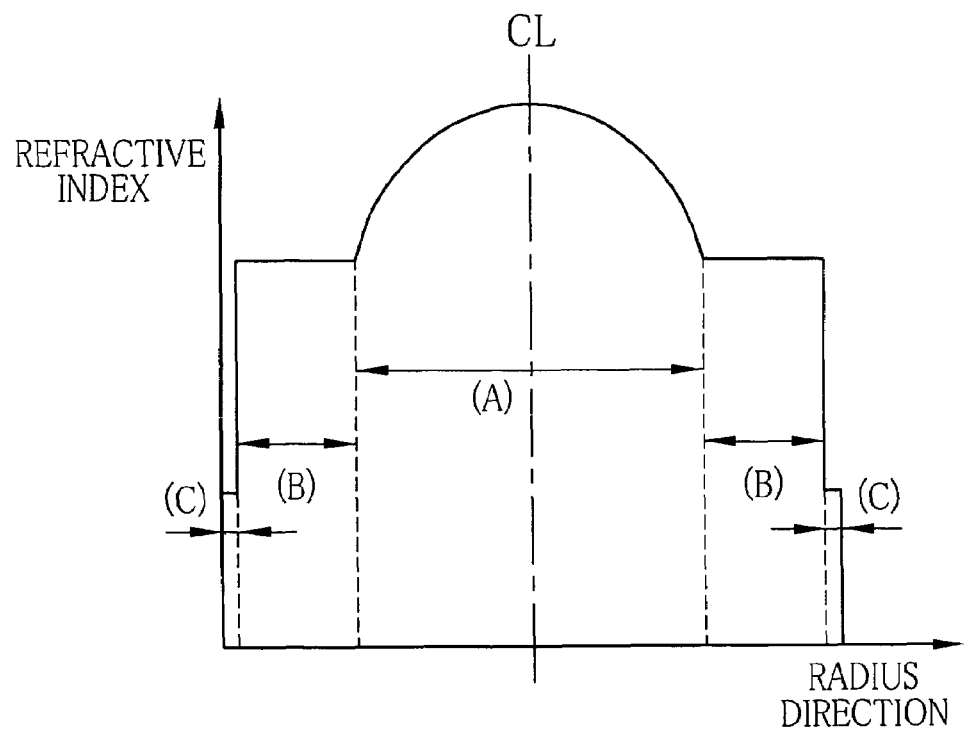
FIG. 2B is a graph illustrating a relation of refractive index and a radius direction of a preform.

In FIG. 2A, an inner core portion 25 is preferably GI type so as to have a high optical transmission property, while the refractive index, as shown in FIG. 2B, continuously decreases from a center to a periphery in the GI type. A horizontal azis shows a length from an edge of the preform in the radial direction thereof and a vertical direction shows a refractive index. An area (A) is a refractive index of the inner core portion 25, an area (B) is a refractive index of the outer core portion 26, and an area (c) is a refractive index of the clad portion 12. In FIG. 2A, the outer core portion 26 is formed of materials to be polymerized during the formation of the inner core portion 25, and has a roll for improving a compatibility of the inner core to the clad in the POF and for an inner wall in the interfacial gel polymerization. The clad pipe 12 is excellent in a mechanical strength, and preferably formed of such materials to prevent the escape of the transmitted light from the produced POF.

In followings, a method of producing the preform will be explained, in which materials of the clad portion (or the clad of the POF) and the core portion (or the core of the POF), and predetermined additives will be described. Note that the present invention is not restricted in the explanations, since they are made for describing the present invention in detail.

Usually, the material for the clad is a thermoplastic polymer having transparency. The refractive index of the clad is lower than that of the core such that the light transmitted in the core may be totally reflected on an interface between the core and the clad. Further, in order to prevent the optical anisotropy, amorphous polymer is used. Further, it is preferable to use the materials such that the clad has the high adhesiveness to the core and is excellent in mechanical properties and wet-heat resistance.

As such polymer, for example, there is polymethyl methacrylate (PMMA). Further, there are co-polymers as a polymerization of methylmethacrylate (MMA) to acrylate fluorides (such as trifluoroethyl methacrylate (FMA), hexafluoroisopropyl methacrylate or the like). Further, there are co-polymers of MMA to (meth)acrylate having a branched chain (such as tert-butylmethacrylate and the like) and alicyclic (meth)acrylate having ring (such as isobonyl methacrylate, norbonyl methacrylate, tricyclodecanyl methacrylate and the like). Further, there are polycarbonate, norbornen type resins (for example ZEONEX (trade mark, produced by Zeon Corporation) and the like), functional norbornen type resins (for example, ARTON (produced by JSR Corporation), and the like), fluoro carbon resins (for example, polytetrafluoroethylene (PTFE), polyvinylydene fluoride (PVDF), and the like). Further, there are co-polymer of fluoro carbon resins (for example, PVDF type co-polymer), tetrafluoroethylene-perfluoro(alkylvinylether) (PFA) random co-polymer, chlorotrifluoroethylene (CTFE) co-polymer. Further, the deuterium atoms may be satisfied for the hydrogen atoms of the polymer so as to decrease the transmission loss.

The materials for the core are not restricted so far as the functions of optical transmission don't decrease. Especially preferable are organic materials having high optical transmission. For example, there are (meth)acrylic acid esters (fluorine-free (meth)acrylic esters (a), fluorine-containing (meth) acrylic esters (b)), styrene type compounds (c), vinylerters (d) and bisphenol A (material of polycarbonates). Further, there are homo-polymers produced from one sort of monomer, co-polymers produced from at least two sorts of monomer, or a mixture of homopolymer and the copolymer. Among them, it is preferable to use materials containing a composition of (meth)acrylic acid esters. Note that as the outer core may be formed from the same materials as the inner core, and otherwise the materials for the core may be determined in consideration of the compatibility of the clad.

In the above polymerizable monomers, concretely, (a) fluorine-free (meth)acrylic esters are methyl methacrylate (MMA), ethyl methacrylate, isopropyl methacrylate, tert-butyl methacrylate, benzyl methacrylate, phenyl methacrylate, cyclohexyl methacrylate, diphenylmethyl methacrylate, tricyclo [5·2·1·0$^{2.6}$] decanyl methacrylate, adamantly methacrylate, isobornyl methacrylate, norbornyl methacrylate, methyl acrylate, ethyl acrylate, tert-butyl acrylate, phenyl acrylate and the like. (b) The fluorine-containing (meth) acrylic esters are 2,2,2-trifluoroethyl methacrylate, 2,2,3,3-tetrafluoropropylmethacrylate, 2,2,3,3,3-pentafluoropropyl methacrylate, 1-trifluoromethyl-2,2,2-trifluoroethyl methacrylate, 2,2,3,3,4,4,5,5-octafluoropentyl methacrylate, 2,2,3,3,4,4-hexafluorobutyl methacrylate, and the like. Further, (c) the styrene type compounds are styrene, α-methylstyrene, chlorostyrene, bromostyrene and the like. Further, (d) the vinylerters are vinylacetate, vinylbenzoate, vinylphenylacetate, vinylchloro acetate, and the like. the materials are not restricted in them.

Further, when a near infrared ray passes through the POF or the plastic optical code 19, the C—H bonds in the polymer molecule causes an absorption loss. Therefore as described in the Japanese Patent Publication No. 3332922 and the Japanese Patent Laid-Open Publication No. 2003-192708, it is preferable to use the materials in which the substitution of deuterium or fluorine is made, such as the deuterated polymethyl methacrylate (PMMA-d8), polytrifluoroethyl methacrylate (P3FMA), polyhexafluoroisopropyl 2-fluoro acrylate (HFIP 2-FA). Thus the wavelength range in which the transmission loss occurs shifts into a longer wavelength side, and therefore the loss of the transmitted light is decreased. In order to keep the transparency of the materials in the polymerization, it is preferable to remove before the polymerization the impurities and the foreign materials causing the scatter.

When the polymer is produced in the polymerization of the polymerizable monomers, the polymerization initiator is used. In this case, as the polymerization initiator, there are materials generating radicals. As such materials, there are peroxide comounds, for example, benzoylperoxide (BPO), tert-butylperoxy-2-ethylhexanate (PBO), di-tert-butylperoxyde (PBD), tert-butylperoxy isopropylcarbonate (PBI), n-butyl-4,4-bis(tert-butylperoxy)varalate (PHV) and the like. Further, there are azo compounds, for example, 2,2'-azobisisobutylonytril, 2,2'-azobis(2-methylbutylonitril), 1,1'-azobis(cyclohexane-1-carbonitryl), 2,2'-azobis(2-methylpropane), 2,2'-azobis(2-methylbutane), 2,2'-azobis(2-methylpentane), 2,2'-azobis(2,3-dimethylbutane), 2,2'-azobis(2-methylhexane), 2,2'-azobis(2,4-dimethylpentane), 2,2'-azobis(2,3,3-trimethylbutane), 2,2'-azobis(2,4,4-trimethylpentane), 3,3'-azobis(3-methylpentane), 3,3'-azobis(3-methylhexane), 3,3'-azobis(3,4-dimethylpentane), 3,3'-azobis(3-ethylpentane), dimethyl-2,2'-azobis(2-methylpropionate), diethyl-2,2'-azobis(2-methylpropionate), di-tert-butyl-2,2'azobis(2-methylpropipnate) and the like. Note that the polymerization initiators are not restricted in them, and two or more sorts of them can be used.

In order to keep several sorts of the physical properties (such as mechanical properties and thermal properties) of the polymer uniform, it is preferable to adjust the polymerization degree. For the adjustment, a chain transfer agent can be used. The sort and amount of the chain transfer agent can be adequately determined depending on the sort of the used polymerizable monomers. The chain transfer coefficient of the chain transfer agent can be referred to, for example, "Polymer Handbook 3$^{rd}$ Edition, (J. Brandrup and E. H. Immergut, issued by John Willy & Son). Further, the chain transfer coefficient can be obtained in an experiment, with reference to "Takayuki Ohtsu, Masayoshi Kinoshita, 'Experiments of Polymer Synthesis', Kagakudojin {ISBN: 4-7598-0052-2}"

As the chain transfer agent, there are alkylmercaptans (for example, n-butylmercaptan, n-pentylmercaptan, n-octylmercaptan, n-laurylmercaptan, tert-dodecylmercaptan and the like), thiophenols (for example, thiophenol, m-bromothiophenol, p-bromothiophenol, m-toluenethiol, p-toluenethiol and the like), and the like. Especially preferable is to use alkylmercaprans, such as n-octylmercaptan, n-laurylmercaptan, tert-dodecylmercaptan. Further, in the chain transfer agent, the deuterium atom or fluorine atom may be substituted for the hydrogen atom on C—H bond. Note that the chain transfer agent is not restricted in them, and two or more sorts thereof may be used.

When the core is the GI type having the above refractive index distribution, the optical transmittance can be made in the wide band to increase the properties of the optical transmittance, and the POF including the core of the GI type is preferably used for high performance communication.

A method for providing the refractive index distribution is described in some publications. For example, the combinations of plural polymers having several refractive indexes or the co-polymer of these plural polymers are used as the polymer for forming the core of the POF. Otherwise, Otherwise, additives (hereinafter, dopant) are provided for a polymer matrix with a refractive index distribution. For example, in a brochure of International Publication under PCT No. 93/08488, the dopants for adjusting the refractive index are added to monomers so as to condense the dopants in a central area of the core in excluded-volume effect. In Japanese Patent Laid-Open Publication No. 2001-215345, the copolymerization rate of the monomers having different refractive indexes is adjusted from the outer area to the inner area so as to change the refractive index in the radius direction of the POF. Further, in Japanese Patent Laid-Open Publication No. H08-334635, the dopants for the refractive index distribution are dispersed in the heating such that the refractive index of the core may change in accordance with the dispersion rate of the dopants.

The dopant has different refractive index from the polymerizable compounds. Preferably, the difference of the refractive index is at least 0.005. When the polymer contains the dopant, the refractive index becomes higher. The solubility parameter of the dopant is at most $7(cal/cm^3)^{1/2}$ different from the polymer produced in synthesizing the monomer, and the increase of the refractive index of the polymer is preferably at least 0.001 in comparison of the polymers produced from the monomers as described in Japanese Patent Publication No. 3332922 and Japanese Patent Laid-Open Publication No. 5-173026. The materials selected as the refractive index control agent may be stable also under existence of the polymer and the situation of the polymerization of the polymerizable monomer of the above materials.

The dopant may be polymerizable materials. In this case, it is preferable that the co-polymer containing co-polymer elements as the dopant has larger refractive indexes than the polymer containing no co-polymer materials, and the following conditions are preferably satisfied. Further, the dopant to be used in the present invention are stable under the polymerization conditions (heating, increasing pressure and the like) of the polymerizable monomers as the raw materials described above. In this embodiment, the dopant is contained in the polymerizable compounds for forming the core portion, the progress of the polymerization is controlled in the process for formation of the core portion by an interfacial gel polymerization, and the concentration of the dopant is varied in accordance to the position in the outer and inner core portions for forming the core of the POF. Otherwise, the refractive index modifier is dispersed after the forming of the preform. The POF having the GI type core is called a GI-POF, which has a wide transmission range.

As the dopant, there are, for example, benzyl benzoate (BEN); diphenyl sulfide (DPS); triphenyl phosphate (TPP); benzyl n-butyl phthalate (BBP); diphenyl phthalate (DPP); biphenyl (BP); diphenylmethane (DPM); tricresyl phosphate (TCP); diphenylsulfoxide (DPSO) and the like. Especially preferable dopants are BEN, DPS, TPP, DPSO, derivatives of diphenylsulfide and derivatives of dithiadine. Further, as the polymerizable components, there are tribromo phenylmethacrylate and the like. When the refractive index control agent to be used is the polymerizable components, the polymerizable refractive index control agent and the polymerizable monomers are polymerized to produce copolymer, and the refractive index is controlled in each layer. Accordingly, although the control of several properties (especially optical property) is more difficult, the move of the dopant can be reduced, and therefore the refractive index distribution can be provided as it planed, Thus, in this method, the content of the refractive index modifier is adjusted, the distribution thereof is changed such that the predetermined refractive index of the POF may be formed. The amount of additives is determined in accordance to a way of use, formation of use and the raw materials of the core.

Other additives may be contained in the core and the clad of the POF so far as the transmittance property is not decreased. For example, the stabilizers may be added to the core for increasing the resistance to climate and the durability. Further, induced emissive functional compounds may be added for amplifying the optical signal. When these compounds are added to the monomers, the attenuated signal light can be amplified in effect of an excitation light, and the transmission distance becomes larger. Therefore the POF can be used as an optical fiber amplifier for a link. These additives, after added to the polymerizable compounds as the material, are polymerized, which is contained the core and the clad.

In the producing method of the preform 15, the clad tube 12 is produced in the clad production process 11. The method of forming the clad tube 12 is not restricted especially, and several methods well known can be applied to forming the clad tube 12. For example, when PVDF is used as the raw materials of the clad tube 12, the clad tube 12 is formed by the melt-extrusion method, in which the PVDF as the thermoplastic polymer forms to have a cylindrical shape continuously. In this method, all of above polymer can be used. However, the fluorine resins are preferably used in considering the physical properties (such as the refractive index) and capabilities. Especially, the PVDF is excellent in mechanical strength, and since the core formed from it has a low refractive index, the light trapping effect is high. When the preform is formed in the interfacial gel polymerization method, the preform becomes a reaction tank (reactor for polymerization). Therefore it is preferable that a stopper is provided at an end of the clad tube 12. In this embodiment, (meth)acryl resins (PMMA and the like) can be used as the raw materials of the clad tube 12.

Further, the clad tube 12 can be produced by a method of the rotating polymerization in the clad production process 11. For example, when PMMA is used as the polymer of the clad tube 12, MMA is used as the polymerizable monomers. MMA is mixed with predetermined additives (such as reaction initiator, the chain transfer agent, and the dopant) and the like to prepare a clad liquid for forming the clad tube (or the clad of the POF). Then the clad liquid is supplied into a cylindrical reactor for polymerization which has enough rigidity and an inner diameter corresponding to the outer diameter of the preform to be formed. Then, the reactor for polymerization is shaken in a warm water to make a previous polymerization such that the viscosity of the clad liquid may be increased. Thereafter, the reactor for polymerization is disposed such that the lengthwise direction may be set horizontally. In this situation, the rotating polymerization is made with the heating. In the rotating polymerization, note that the lengthwise direction of the reactor for polymerization is not restricted in horizontally setting. For example, the direction may be a perpendicular direction (almost parallel to the direction of gravity), and an inclined direction between the horizontal direction and the perpendicular direction. Thus the polymerization is made on an inner wall of the reactor for polymerization, so as to form the clad tube 12 having an almost uniform thickness. It is preferable to remove the gas from the clad liquid after the preparation thereof by ultrasonic treatment or a decompression treatment. It is preferable to make the polymerization in an atmosphere of inert gas, such as helium, argon, nitrogen and the like. Note that the production of tube in the market can be used as the clad tube 12.

The clad tube used in the present invention may have a multi-layer structure constructed of plural layers so as to improve several capabilities, such as to increase mechanical strength, to be provided with the inflammability and the like. In this multi-layer structure, the polymerization properties and the moisture resistance can be provided for the different layers of the core portion. For example, there is a case that the clad tube 12 is constructed two layers, namely an inner clad layer as an interface layer to the core portion to be formed and an outer clad layer over the inner clad layer. In this case, preferably, the outer clad layer has a moisture property and the inner clad layer has a function for initiating the polymerization for forming the core portion. Preferably, materials for forming the inner clad layer having this function prevent the occurrence of the interfacial irregularity during the interfacial gel polymerization for forming the core portion.

Concretely, a difference of the solubility parameter between the materials (polymers) for forming the inner clad layer and the materials (polymers) for forming the core portion is at most $14000(J/m^3)^{1/2}$ [$=7(cal/cm^3)^{1/2}$], preferably at most $10000(J/m^3)^{1/2}$ [$=5(cal/cm^3)^{1/2}$], and especially at most $6000(J/m^3)^{1/2}$ [$=3(cal/cm^3)^{1/2}$]. Further, the materials for forming the inner core layer may be selected in consideration of at least the functions for initiating the core portion. Therefore the materials may be not only the above ones for forming the single layer structure of the clad portion, but also others whose solubility parameters may be in the above ranges. Otherwise, in order to form the outer clad layer, it is not necessary to consider the functions for initiating the polymerization. Accordingly, the materials for forming the outer clad layer may be not only the above materials, but also the polymers whose water absorption coefficient is less than 1.8%. It is to be noted that the multi-layer tube used for producing the preform is called the clad tube in this embodiment. However, an inner layer of the multi-layer tube may be used as one layer of the core in the POF (corresponding the outer core portion of the preform described above). Also in this case, the inner layer of the tube has the function for initiating the polymerization for forming another layer (corresponding the inner core portion of the preform described above).

The length L1 of the clad tube 12 used in the present invention is preferable at most 3000 mm, particularly from 300 mm to 2000 mm, and especially 500 mm to 1500 mm. If the length L1 is less than 300 mm, the productivity is not high. If the length L1 is more than 3000 mm, the removal of the voids becomes hard. Note that the detail of this point is described below. Further, in the optical viewpoint and strength, a thickness t1 of the clad pipe is preferably from 0.01 mm to 10 mm, particularly from 0.1 mm to 5 mm, and especially 0.5 mm to 5 mm.

The first polymerization process 13 will be explained. The outer core liquid is prepared from the polymerizable monomers (for example, MMA and the like) and the predetermined additives (for example, polymerization initiator, chain transfer agent, dopant and the like). Thereafter, the outer core liquid is supplied into the clad tube 12. The outer core portion 26 is formed on the inner surface of the clad tube 12, and thereby the formation is preferably made by the rotating polymerization, which is the same as the formation of the clad tube 12. Thus the outer core portion is formed to have a cylindrical shape with a thickness t2, which is preferably from 0.05 mm to 10 mm, particularly from 0.5 mm to 5 mm, and especially 1 mm to 3 mm. It is preferable to remove the gas from the outer core liquid after the preparation thereof by ultrasonic treatment or a decompression treatment.

Thereafter, the outer core liquid is supplied into the clad tube 12. The outer core portion 26 is formed on the inner surface of the clad tube 12, and thereby the formation is preferably made by the rotating polymerization, which is the same as the formation of the clad tube 12. Thus the outer core portion is formed to have a cylindrical shape with a thickness t2, which is preferably from 0.05 mm to 10 mm, particularly from 0.5 mm to 5 mm, and especially 1 mm to 3 mm.

Figure 3A:
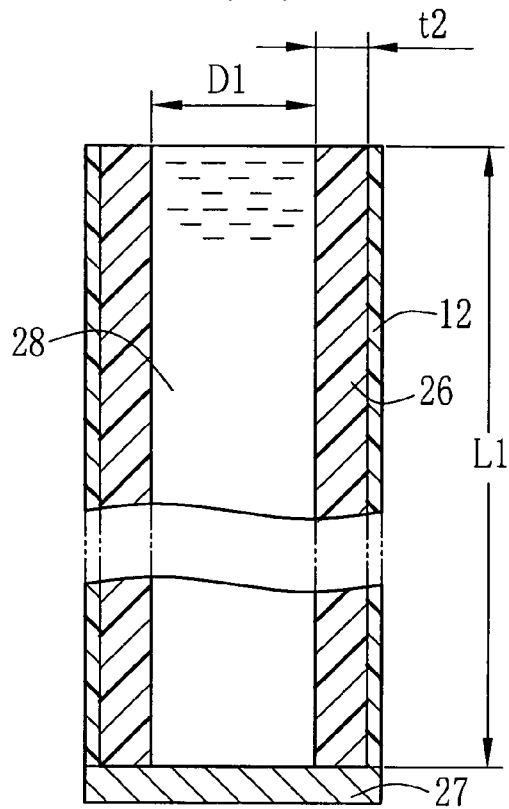
FIGS. 3A-3D are vertical sectional views illustrating processes for forming the preform in FIG. 2A.
Figure 3B:
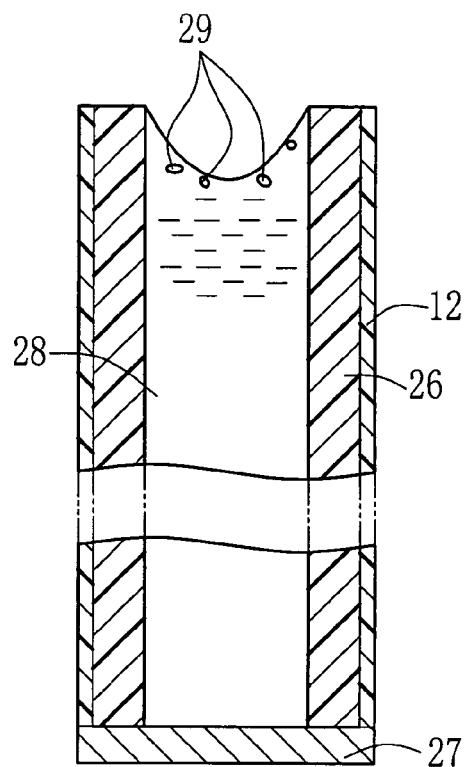
Figure 3C:
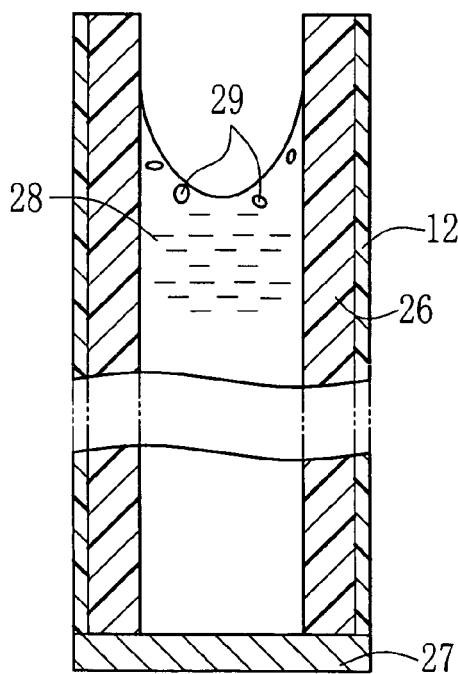
Figure 3D:
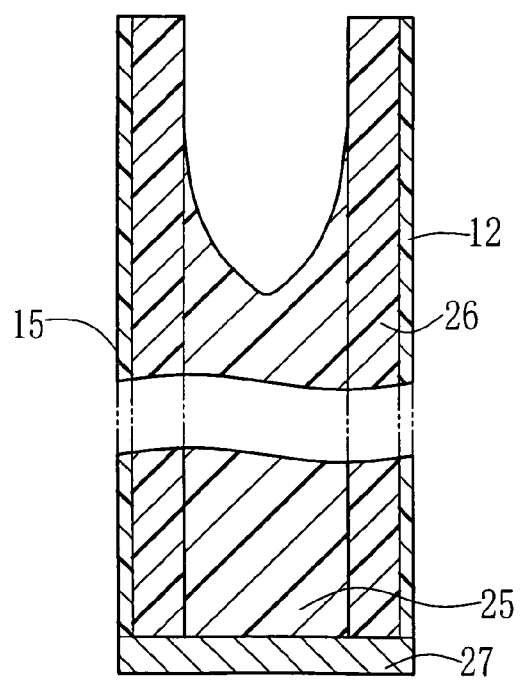

The second polymerization process 14 will be explained in reference to FIGS. 3A-3D. The inner core liquid is prepared from the polymerizable monomers and the predetermined additives (for example, polymerization initiator, chain transfer agent, dopant and the like). It is preferable to remove the gas from the inner core liquid after the preparation thereof by ultrasonic treatment or a decompression treatment. As shown in FIG. 3A, an end of the clad tube 12 having the length L1 is provided with a stopper 27 to close the end such that the clad tube 12 and the stopper 27 construct the reactor for polymerization. Then an inner core liquid 28 is supplied into the inner space of the clad tube 12. In order to start the polymerization, the clad tube 12 is heated or a light is illuminated onto the clad tube 12. Thus when the polymerization starts and proceeds, the volume of the inner core liquid 28 becomes smaller. Further, in the progress of the polymerization, as shown in FIG. 3B, the gas 29 is generated in the inner core liquid 28, and escape from the liquid surface. When the polymerization is further proceeded, as shown in FIG. 3C, the volume of the inner core liquid 28 becomes smaller moreover. The evaporation is continuously made in the polymerization reaction and the generation of the gas 29 dissolved in the inner core liquid 28. When the polymerization of the inner core liquid 28 is completed, the inner core portion 25 is formed. Thus the preform 15 is obtained. Note that when the monomers are polymerized in the formation of the inner core portion 25, the percentage of decrease in volume of the monomers is preferably at most 25%.

Note in the present invention that the forming method of the core portions is not restricted in the above methods. For example, the inner core portion can be formed by the interface polymerization with rotating, as in forming the outer core portion. In this case, the inner core liquid is supplied into an inner space of the outer core portion in the clad tube, and the lengthwise direction of the clad tube is horizontally set to a polymerization apparatus and rotated with the stopper closing the one end, to perform the polymerization. Thereby the supply of all the inner core liquid is at a time, gradually or continuously, thereby the contents of the polymerizable materials in the inner core liquid is adjusted in the supply amount, the composition, and the polymerization degree. Thus not only the GI-POF having the continuous refractive index distribution, but also multi-step index type POF having the stepwise refractive index distribution is produced.

The method of forming the outer core portion is not restricted especially, and there are already-known methods. For example, the melt polymers may be extruded to form, or monomers are supplied in a tube so as make the polymerization of the monomers. Thereby, if there are irregularities or distortions such as subtle unevenness in the interface between the inner core portion and the outer core portion, the loss of the transmission capability (such as scattering and the like) occurs. Therefore the interface irregularities are carefully prevented. The order of production of the inner and outer core portions. For example, after the production of the inner core portion, the outer core portion may be formed on the periphery of the inner core portion. Furthermore, the polymerization may be made in the tube such that the outer core and the inner core therein may be formed through drawing after the polymerization. Otherwise, an inner core portion is formed separately from the outer core tube, and the inner core portion is inserted into the tube. Thereafter, the drawing is made such that the inner core portion may form the inner core and the tube may form the outer core.

The diameter D1 (mm) of the inner core portion 25 is preferably at least 5 mm, particularly from 5 mm to 50 mm, and especially 10 mm to 50 mm. The upper limit of the diameter D1 is not restricted especially. However, when the inner core portion 25 is formed by the interfacial gel polymerization method, the upper limit of the diameter D1 is preferably 50 mm, particularly 32 mm, and especially 25 mm. A ratio (D1/t2) of the diameter D1 of the inner core portion 25 to the thickness t2 of the outer core portion 26 satisfies $2 \leq (D1/t2)$, preferably $5 \leq (D1/t2) \leq 100$, especially $5 \leq (D1/t2) \leq 50$. These ranges satisfy the range of $0.67 \leq (Ra/Rb) \leq 0.87$ which is the especially preferable range in view of the optical connection, since the profiles of the refractive index are analogicus between the preform 15 and the POF 17 obtained by drawing the preform 15. Therefore the above ranges are preferable for the production and the practical use. Further, a ratio of the length L1 of the clad tube 12 to the diameter D1 of the inner core portion 25 satisfies preferably $4 \leq (L1/D1) \leq 100$, particularly $10 \leq (L1/D1) \leq 100$, and especially $30 \leq (L1/D1) \leq 100$.

As described above, the relation between the diameter D1 of the inner core portion 25 and the thickness t2 of the outer core portion 26 or the length L1 of the clad tube 12 is determined. Thus, since the evaporation is easily made from the liquid surface, it is prevented that the voids of the gas remain in the inner core portion 25. Further, when the preform 15 is drawn in the drawing process 16, the POF 17 in which the generation of the voids is also extremely reduced is obtained. Since there are extremely little voids in the obtained POF, the unusable part is so little that the productivity is high, and furthermore the transmission loss is very low.

Figure 4A:
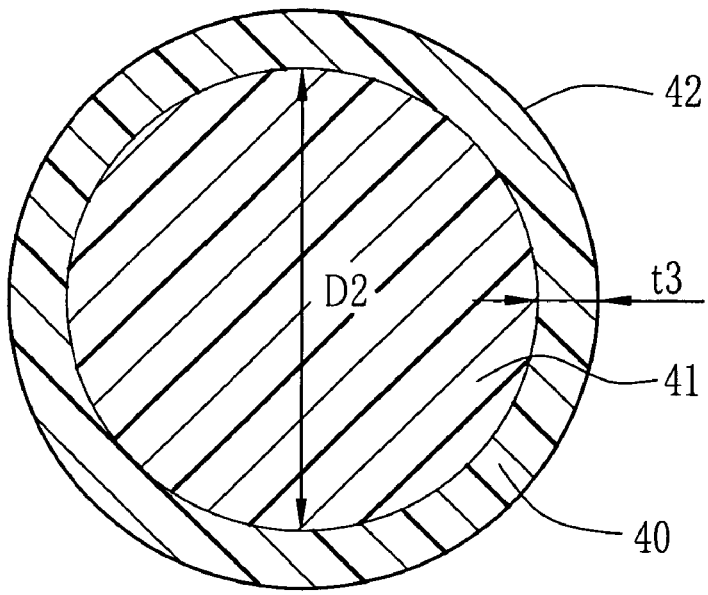
FIG. 4A is a cross-sectional view of another embodiment of a preform.
Figure 4B:
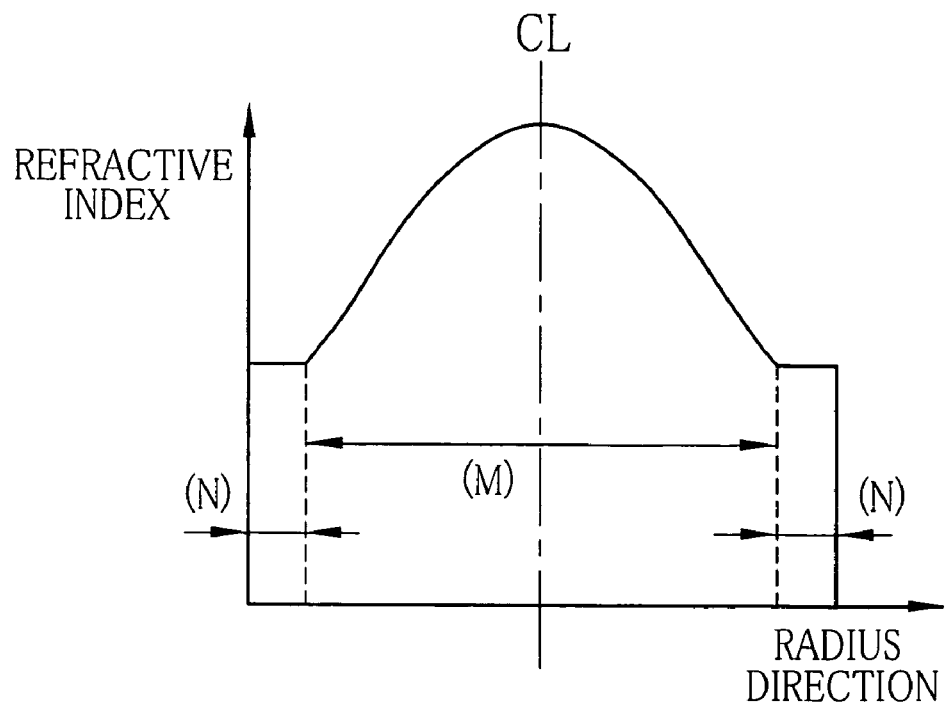
FIG. 4B is a graph illustrating a relation of a refractive index and a radius direction of the preform in FIG. 4A.

Other embodiments of the present invention will be explained in reference with FIGS. 4A-5D. In FIG. 4A-4B, a preform 42 has a clad portion 40 and a core portion 41, and is the GI-POF. In FIG. 4B, an area (M) is a refractive index of the core portion 41, and an area (N) is a refractive index of the clad portion 40. The clad portion 40 has the largest refractive index in the center thereof, and the refractive index gradually becomes lower in the outer side.

Figure 5A:
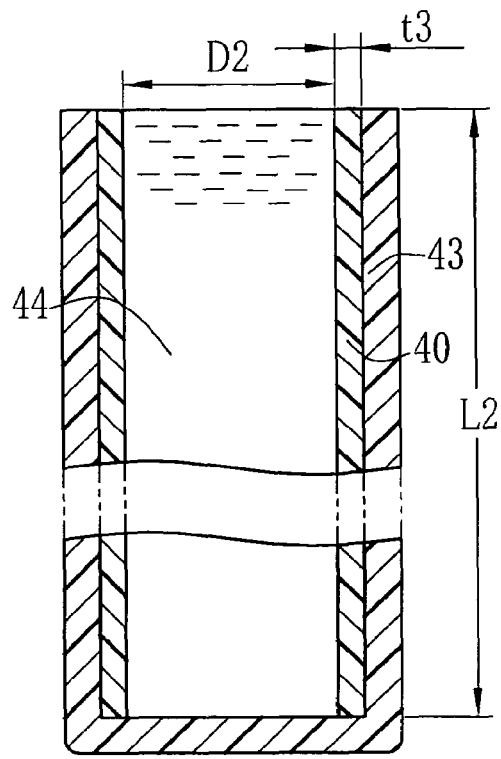
FIGS. 5A-5D are vertical sectional views illustrating processes for forming the preform in FIG. 4A.

The producing method of the preform 42 in reference with FIGS. 5A-5D. The clad liquid containing MMA, the additives and the like is supplied into a glass tube 42, and the clad portion 40 is formed by the rotating polymerization so as to have a length L2 (mm), a thickness t3 (mm) an inner diameter (or a diameter of the core portion 41) D2 (mm). As shown in FIG. 5A, an inner core liquid 44 containing MMA, the polymerization initiator, and the dopant is supplied into a space in the clad portion.

Figure 5B:
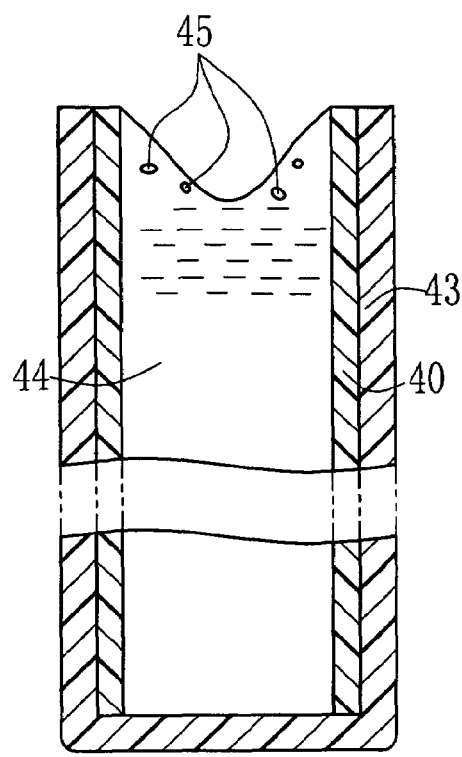
Figure 5C:
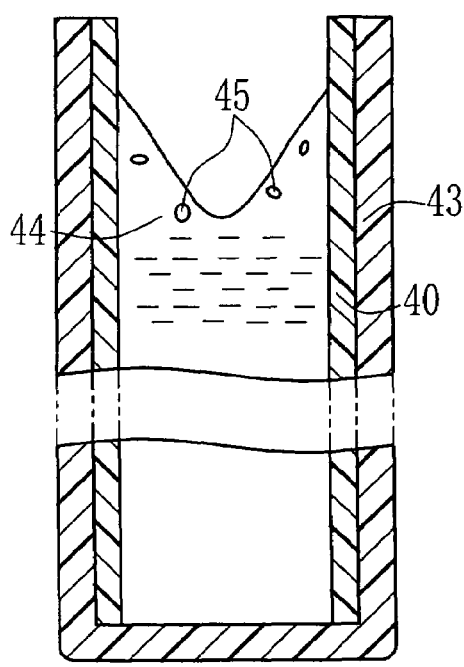
Figure 5D:
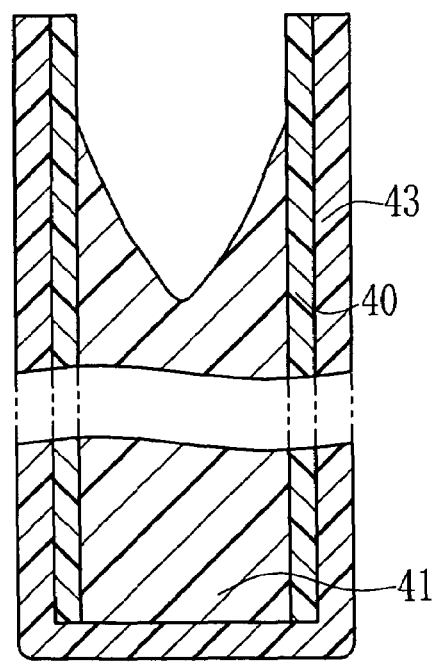

When a glass tube 43 is heated or disposed in an illumination of light, the polymerization of the monomers in the inner core liquid 44 starts. Thus a core portion whose main content is polymer is formed. As shown in FIG. 5B, in the polymerization of the monomers, the contraction in volume of the inner core liquid 44 occurs, and an evaporation of the inner core liquid 44 is made to generate gasses 45. Then in the procedure of the polymerization with decreasing the volumes, as shown in FIG. 5C, the contraction in volume progresses. Then, as shown in FIG. 5D, the polymerization of the inner core liquid 44 is complete to form the core portion 41 in the clad portion 40. Thus the preform 42 is obtained.

The diameter D2 (mm) of the core portion 41 is preferably at least 5 mm, particularly from 5 mm to 32 mm, and especially 5 mm to 25 mm. The upper limit of the diameter D2 is not restricted especially. However, when the core portion 41 is formed by the interfacial gel polymerization method, the upper limit of the diameter D2 is preferably 50 mm, particularly 32 mm, and especially 25 mm. A ratio (D1/t3) of the diameter D2 of the core portion 41 to the thickness t3 of the clad portion 40 satisfies $2 \leq (D2/t3)$, preferably $5 \leq (D2/t3) \leq 100$, especially $5 \leq (D2/t3) \leq 50$. Further, a ratio of the length L2 of the clad portion 40 to the diameter D2 of the core portion 41 satisfies preferably $4 \leq (L2/D2) \leq 100$, particularly $10 \leq (L2/D2) \leq 100$, and especially $30 \leq (L2/D2) \leq 100$.

The supply amount of the inner core liquid is preferably 98 vol % when the inner diameter and the length of the tube are respectively 16 mm and 1000 mm. In the interfacial gel polymerization method in which the glass tube is perpendicularly disposed, since the end through which the evaporated gas exits is usually positioned in the upper side. Therefore the supply amount is preferably 95 vol %, and particularly 90 vol %. In the rotating gel polymerization method, since the chemical reaction is made on an inner surface of the cylindrical tube, the contraction and the exit of the gas is made more easily than in the interfacial gel polymerization method. Therefore the supply amount may be larger. When it is small, the productivity become lower. Therefore the supply amount is preferably at least 50 Vol %, and especially at least 70 Vol %.

As described above, the relation between the diameter D2 of the core portion 41 and the thickness t3 of the clad portion 40 or the length L2 of the clad portion 40 is determined. Thus it is prevented that the voids of the gas remain in the core portion 41. Further, the generation of the voids is also extremely reduced when the preform 42 is drawn in the drawing process 16 to form the POF 17. If the voids generate, part in which the voids remains cannot be used as the products. However, since there are extremely little voids in the obtained POF, the unusable part is so little that the productivity is high, and furthermore the transmission loss is very low. Note that the POF produced in the present invention may be the multi-step index (MSI) POF having the stepwise refractive index distribution, in which the refractive index decreases from a center to a periphery in a step-wise.

The preforms 15,42 formed by above methods are processed to a lens, an optical fiber and the like. In order to produce the optical fiber, the preforms 15,42 are drawn to the POF 17 having a predetermined diameter, for example in the range of 200 μm to 1000 μm. The producing method in the drawing process 16 is not restricted especially, and the already known methods are applied to the drawing process 16. Before the drawing process 16, the preforms 15,42 are dried with the decompression so as to decrease the remaining monomer and the water. Thus in the drawing, it is reduced to generate the voids by evaporating the remaining monomer and the water.

In the drawing process 16, the preforms 15,42 are drawn with the heat-melting. The heating temperature is determined in reference to the raw materials of the preforms 15,42. Usually, the drawing is made preferably at the temperature from 180° C. to 250° C. The drawing conditions (drawing temperature and the like) are determined adequately in consideration of the diameters of the preforms 15,42, the diameter of the POF 17, and the raw materials. For example, as described in Japanese Patent Laid-Open Publication No. 7-234322, the tension for the drawing is at least 0.1 N such that the orientation of the melted polymer may be made, and as described in Japanese Patent Laid-Open Publication No. 7-234324, the tension is at least 1N such that the POF does not have a deformation. Also, as shown in Japanese Patent Laid-Open Publication No. 8-106015, the pretreatment of heating the preform can be used before the drawing of a preform. Further, as shown in Japanese Patent Laid-Open Publication No. 7-244220, the bending properties and the lateral pressure characteristics can be improved by regulating the elongation at break and the strength of the POF 17 obtained in the above methods.

Although the POF can be used as medium for the optical transmission without processing and modifying, a periphery is usually coated with a protective coating for protecting the POF 17 and providing several functions. For example, a one-layer coating is made in the coating process to form a plastic optical code 19, in order to increase a bending of the POF and a weather resistance, prevent the decrease of the function caused by moisture absorbance, increase a tensile strength, provide a compressive strength and inflammability, protect from damage by chemicals, prevent a noise, increase a commercial value by coloring and the like. The POFs or the plastic optical codes are bundled to the optical fiber cable. Note that materials of the protective coating and the method of forming it are not restricted especially.

The adequate materials of the protective coating are compounds which don't provide a thermal damage (for example, deformation, denaturation, heat-dissolution and the like). Concretely, there are following comounds, which have high resiliency and therefore are also effective in the mechanical properties, such as the bending and the like. Concretely, they are isoprene type rubber (for example, natural rubber, isoprene rubber and the like), butadiene type rubber (for example, styrene-butadiene co-polymer rubber, butadiene rubber and the like), diene type specific rubber (for example, nitrile rubber, chloroprene rubber and the like), olefine type rubber (for example, ethylene-propylene rubber, acryl rubber, butyl rubber, butylhalide rubber and the like), ether type rubber, polysulfide rubber, urethane rubber and the like.

As the preferable materials for the protective coating, there are liquid rubbers which has fluidity in a room temperature and losses the fluidity by the heating to harden. Concretely, they are polydiene type (standard structure is polyisoprene, polybutadiene, butadiene-acrylonitril co-polymer, polychloroprene and the like), polyolefine type (for example, the standard structure is polyolefine, polyisobutylene and the like), polyether type (for example, the standard structure is poly (oxypropylene) and the like), polysulfide type (for example, the standard structure is poly(oxyalkylenedisulfide) and the like), polysiloxane type (for example, the standard structure is poly(dimethylsiloxane) and the like) and the like.

Further, thermoplastic elastomers (TPE) can be used. The thermoplastic elastomers have rubber-like elasticity in a room temperature, and are materials which is plasticized at a high temperature and then easily formed. Concretely, there are styrene type TPE, olefine type TPE, vinylchloride type TPE, urethane type TPE, ester type TPE, amide type TPE and the like. Note that the polymers described above are not especially restricted in these elastomers so far as the polymers can be molded at or below a glass transition temperature Tg, and copolymer or the mixture of the above or other polymers can be used.

Further, a liquid as a mixture of prepolymer and reactant can be used and hardened by heating, for forming the coating. For example, as disclosed in Japanese Patent Laid-Open Publication No. 10-158353, there is a one-component thermosetting urethane compositions produced from NCO block prepolymer and fine powder coating amine. Further, as disclosed in International Publication under PCT No. 95/26374, there is a one-component thermosetting urethane compositions produced from NCO containing urethane prepolymer and solid amine having a less than 20 µm diameter. Further, in order to improve the efficiency, additives may be added, such as a flame retardant, an antioxydant, a radical scavenger, a lubricant and the like, and several sorts of fillers composed of inorganic or organic compounds may be added.

Furthermore, when the POF or the plastic optical code is bundled to the optical fiber cable, then a cable coating is formed. There are two types of the optical fiber cables. The first type is an adhesion type, in which the cable coating contacts to the optical fiber bundle of the POF or the first plastic optical code, and the second type is a loose type, in which there is a space between the cable coating and the optical fiber bundle. In the loose type, when the cable coating is peeled at a contact portion to the connecter, moisture may intrude from the peeled portion into the inside of the optical fiber cable. Accordingly, the adhesion type is preferable.

However, in the loose type, as the cable coating is not adhered to the entire surface of the optical fiber bundle, the influences of the stress or the heat on the optical fiber bundle becomes smaller. Accordingly the damage of the POF is reduced. Therefore, there is an occasional case to use the loose type, depending on the object of use. In order to prevent the intrusion of the moisture, the space between the cable coating and the optical fiber bundle is filled with mills or gel-like semisolid materials having fluidity. Further, when the mills or the semisolid materials have effects for preventing the moisture transference, the cable coating of high quality is formed. When the cable coating of the loose type is formed, the position of the extrusion opening of the cross head dies is adjusted to regulate the decompressing device for forming the space. The thickness of the space is controlled by increasing and decreasing the pressure in the spaces.

Further, at least one coating layer may be formed on the plastic optical code. If the first coating layer has a enough thickness, a thermal damage to be provided for the POF decreases. Accordingly, the hardening temperature of the materials for the coating layers cannot so strictly limited as for the first coating layer which directly coats the POF. A second coating layer provided over the first coating layer. The second coating layer may contain the additives to the polymer, which are, for example, flame-retardant, UV-stabilizer, antioxidant, radical scavenger, lubricant. Note that flame-retardant is resin containing halogen such as bromine and the like, or containing phosphorus. However, it becomes more usual that metal hydroxide is used as the flame-retardant, in view of safety by reduction of toxic gas.

Further, in order to provide the several effects, several coatings having different effects may be provided over the POF. As these coating layers, for example, a barrier layer for reducing the moisture absorbance, a layer containing moisture absorbing material (for example, a moisture absorbing tape or a moisture absorbing gel), may be provided in the first coating layer or between the first and the second coating layer. Furthermore, layers containing cushioning materials, such as a bendable layer, an expandable layer and the like, may be formed in order to decrease the stress in bending, and an enforcement layer and the like may be formed in order to increase the rigidity. The sort of layers to be formed is selected in accordance with the way of use. When the fiber materials, such as metallic fiber having high rigidity, a fiber having high elastic modulus, a fiber having high tensile strength, and the like are contained in the polymer or the plasticity resin, the mechanical strength of the obtained optical fiber cable is reinforced.

As the high tensile strength fiber, there are aramid fiber, polyester fiber, polyamide fiber and the like. As the metallic fiber, there are stainless fiber, zinc alloy fiber, copper fiber and the like. However, the sorts of these fibers are not restricted in them. Further, in order to prevent the damage of the POF, the metallic pipes may be provided around the optical materials, such as the optical fiber bundle or the optical fiber cable, or the like, a support line may be provided along them, and otherwise a machine or a mechanism may be used for increasing the workability in wiring the optical materials.

Further, in accordance with the way of use, several optical devices including the POF 17 or the plastic optical code 19 are produced, for example, a cable assembly in which the POF 17 or the plastic optical code 19 is circularly arranged, a tape core wire in which the POF 17 or the plastic optical code 19 is linearly aligned, and a cable assembly in which the tape core wires are bundled with a band, a lap sheath or the like, and so on.

Further, an optical transmission medium in which the POFs of the present invention are used may be conjugated by the matching, since having higher axial offset tolerance than the prior optical fiber. However, it is preferable that a connecter is provided at an end of each optical fiber, and the optical fibers are connected by fixing the connecting portions. As the connecter, there are not only connectors having voids in the connecting portions, but also several types connectors already known, such as PN type, SMA type, SMI type, F05 type, MU type, FC type, SC type and the like. In the attachment of the connecter, the optical transmission medium is cut to have a predetermined length, and emission end surfaces thereof are preferably smooth. The smoothing is made by already known methods, for example, grinding, or contacting the emission end surface to a hot plate so as to melt resins thereon. In the latter case that the resins of the emission end surface is melt, several treatments are easily made, such that the emission end surface may be made wider or narrower, in consideration of optical coupling.

There are several systems for transmitting the optical signals, in which are used the optical members of the present invention, such as the POF, the plastic optical code, the optical fiber cord, the optical fiber cable and the like. The system is constructed of an optical signal processing device which includes optical members and parts, such as a light emitting element, a light receiving element, an optical switch, an optical isolator, an optical integrated circuit, an optical transmitter and receiver module, and the like. Further, another type of the optical fiber and the like may be used in the system, if necessary. In this case, any known techniques can be applied to the present invention. The techniques are described in, for example, "'Basic and Practice of Plastic Optical Fiber' (issued from NTS Inc.)", "'Optical Parts can be Loaded on Printed Wiring Assembly, at Last' in Nikkei Electronics, issued on Dec. 3, 2001", Pages 110-127", and so on. When the present invention is combined with the techniques in these publications, then the optical members are used for the wiring in apparatuses (such as computers and several digital apparatuses), the wiring in the vehicles and vessels, the linking between optical terminals and the digital device, and between the digital devices. Further, in the combination of the present invention with the above techniques, the optical members may be applied to the optical transmitting system adequate for optical transmission in short distance, for example, for data communication of large capacity, for use of control without influence of the electromagnetic wave. Concretely, the optical members produced in the present invention are applied to the optical LAN in each of or the optical LAN between houses, collective housings, fabrics, offices, hospitals, schools in an area, or the optical LAN in each of them.

Further, the other techniques to be combined are disclosed, for example, in "'High-Uniformity Star Coupler Using Diffused Light Transmission' in IEICE TRANS. ELECTRON., VOL. E84-C, No. 3, MARCH 2001, p. 339-344", "'Interconnection in Technique of Optical Sheet Bus' in Journal of Japan Institute of Electronics Packaging., Vol. 3, No. 6, 2000, p. 476-480". Further, in the other techniques, there are a light bus (disclosed in Japanese Patent Laid-Open Publications No. 10-123350, No. 2002-90571, No. 2001-290055 and the like); an optical branching/coupling device (disclosed in Japanese Patent Laid-Open Publications No. 2001-74971, No. 2000-329962, No. 2001-74966, No. 2001-74968, No. 2001-318263, No. 2001-311840 and the like); an optical star coupler (disclosed in Japanese Patent Laid-Open Publications No. 2000-241655); a device for optical signal transmission and a light data bus system (disclosed in Japanese Patent Laid-Open Publications No. 2002-62457, No. 2002-101044, No. 2001-305395 and the like); a processing device of optical signal (disclosed in Japanese Patent Laid-Open Publications No. 2000-23011 and the like); a cross connect system for optical signals (disclosed in Japanese Patent Laid-Open Publications No. 2001-86537 and the like); a light transmitting system (disclosed in Japanese Patent Laid-Open Publications No. 2002-26815 and the like); multi-function system (disclosed in Japanese Patent Laid-Open Publications No. 2001-339554, No. 2001-339555 and the like); and several sorts of waveguides, optical branching, optical couplers, optical multiplexers, optical demultiplexers and the like. When the present invention is combined with these techniques, the optical members produced in the present invention are used in a system of the optical transmission of high grade, in which the signal is multiply sent and received, and otherwise used for lighting, energy transmission, illumination, and sensors.

EXAMPLE

In followings, the present invention will be explained more concretely with reference to example. In the example, sorts, ratio thereof, operations and the like can be changed so far as they cover the spirit of the present invention. Accordingly, the present invention is not restricted in the example. In this example, Experiments 1-7 were made. In Experiments 2-7, the same explanations as Experiment 1 are omitted.

In Experiment 1, the fiber perform was manufactured in the following method (see FIG. 5). The stopper is attached to a bottom of the glass tube 43 having inner diameter of 20 mm and a length of 600 mm, and the clad liquid was prepared so as to contain 130 g MMA, 0.05 wt % benzoyl peroxide as the reaction initiator, and 0.4 wt % n-laurylmercaptan as chain transfer agent. The clad liquid is supplied into the glass tube 43 and polymerization was made at 3000 rpm (the rotation speed) and 70° C. for 5 hours. Thereafter, the heating was made at 2000 rpm and 90° C., for 24 hours to form the clad portion 40 over all on the inner surface of the glass tube 43. Therefore the length L2 was 600 mm. Thereafter, the hollow part in the clad portion 40 was supplied with the core liquid containing the reaction initiator, the chain transfer agent, and the MMA (containing 12.5% diphenylsulfide as the dopant). Thereafter the glass tube 43 was stationary disposed in an autoclave, and the polymerization was made at 100° C. for 48 hours and then at 120° C. for 24 hours in an anneal process. Thus the fiber perform 42 was obtained, and taken out from the glass tube 43 after hardened. The clad portion contained no dopant and therefore had no distribution of refractive index. The thickness t3 of the clad portion 40 was 2 mm. The core portion 41 contained the dopant which was diffused therein, and had the distribution of refractive index. The diameter D2 of the core portion 41 was 16 mm. The ratio (D2/t3) of the diameter D2 to the thickness t3 of the clad portion 40 was 8, and the ratio (L2/D2) of the length L2 of the clad portion 40 to the diameter D2 of the core portion 41 was 37.5. In the fiber perform 42, there remained no voids.

In Experiment 2, the fiber perform was manufactured in the following method (see FIG. 3). The stopper 27 is attached to a bottom of the cylindrical clad tube 12 which is formed from PVDF and has the inner diameter of 20 mm and a length of 600 mm. The clad liquid of Experiment 1 was used as the outer core liquid of Experiment 2. The outer core liquid was supplied into the clad tube 12 and polymerization was made at 3000 rpm (the rotation number) and 70° C. for 5 hours. Thereafter, the heating was made at 2000 rpm and 90° C., for 24 hours to form the outer core portion 26 on the inner surface of the glass tube 43. Thereafter, the inner core liquid was prepared by adding diphenyl sulfide to the outer core liquid such that the content of the diphenylsulfide in the prepared inner core liquid was calculated to be 7 wt %. Then the inner space in the outer core portion was supplied with the inner core liquid. Thereafter the clad tube 12 was stationary disposed in an autoclave, and the polymerization was made at 100° C. for 48 hours and then at 120° C. for 24 hours in an anneal process. Thus the preform 15 was obtained. The outer core portion 26 contained no dopant and therefore had no refractive index distribution. The thickness t2 of the outer core portion 26 was 2 mm. The inner core portion 25 contained the dopant which was diffused therein, and had the distribution of refractive index. The diameter D1 of the inner core portion 25 was 16 mm. The ratio (D1/t2) of the diameter D1 to the thickness t2 of the outer core portion 26 was 8, and the ratio (L1/D1) of the length L2 of the clad tube 12 to the diameter D1 of the inner core portion 25 was 37.5. In the fiber perform 15, there remained no voids.

In Experiment 3, the glass tube having 1000 mm length was used. The clad liquid contained MMA 217 g, and the content of the diphenylsulfide was 7 wt. %. Other conditions were the same as Experiment 1. The water content of each clad liquid and the core liquid was measured, and that of the clad liquid was 0.057% by mass, and that of the core liquid was 0.032 mass %. The diameter D2 of the core portion was 16 mm, the thickness t3 of the clad portion 40 was 2 mm, and the ratio (D2/t3) was 8. The length L2 of the clad portion was 1000 mm, and the ratio (L2/D2) was 62.5. In the fiber perform 42, there remained no voids.

In Experiment 4, the glass tube having 10 mm inner diameter was used. The clad liquid contained MMA 70 g, and the content of the diphenylsulfide was 7 wt. %. Other conditions were the same as Experiment 1. The diameter D2 of the core portion was 4.6 mm, the thickness t3 of the clad portion 40 was 2.7 mm, and the ratio (D2/t3) was 1.7. The length L2 of the clad portion was 600 mm, and the ratio (L2/D2) was 130.4. In the fiber perform 42, there remained 8 voids. Parts in which there are no voids are drawn, and the yield ratio decreased to 20% to the case in which no voids are remained in the fiber perform 42.

In Experiment 5, the glass tube having 10 mm inner diameter and 1500 mm length was used. The clad liquid contained MMA 100 g, and the content of the diphenylsulfide was 7 wt. %. Other conditions were the same as Experiment 1. The diameter D2 of the core portion was 6.4 mm, the thickness t3 of the clad portion 40 was 1.8 mm, and the ratio (D2/t3) was 3.6. The length L2 of the clad portion was 1500 mm, and the ratio (L2/D2) was 234.4. In the fiber perform 42, there remained 4 voids. Parts in which there are neither bubbles nor voids are drawn, and the yield ratio decreased to 40% to the case in which no voids are remained in the fiber perform 42.

In Experiment 6, the glass tube having 1500 mm length was used. The clad liquid contained MMA 300 g, and the content of the diphenylsulfide was 7 wt. %. Other conditions were the same as Experiment 1. The diameter D2 of the core portion was 17.6 mm, the thickness t3 of the clad portion 40 was 1.2 mm, and the ratio (D2/t3) was 14.7. The length L2 of the clad portion was 1500 mm, and the ratio (L2/D2) was 85.2. In the fiber perform 42, there remained no voids.

In Experiment 7, the glass tube having 10 mm inner diameter and 1000 mm length was used. The clad liquid contained MMA 80 g, and the content of the diphenylsulfide was 7 wt. %. Other conditions were the same as Experiment 1. The diameter D2 of the core portion was 6.2 mm, the thickness t3 of the clad portion 40 was 1.9 mm, and the ratio (D2/t3) was 3.3. The length L2 of the clad portion was 1000 mm, and the ratio (L2/D2) was 161.3. In the fiber perform 42, there remained 3 voids. Parts in which there are no voids are drawn, and the yield decreased to 60% to the case in which neither bubbles nor voids remained in the fiber perform 42.

The results of the Experiments 1-7 (Ex. 1-7) are shown in Table 1.

TABLE 1

|  | L1 | L2 | t2 | t3 | D1 | D2 | L1/D1 | L2/D2 | D2/t3 | D1/t2 |
|---|---|---|---|---|---|---|---|---|---|---|
| Ex. 1 | — | 600 | — | 2 | — | 16 | — | 37.5 | 8 | — |
| Ex. 2 | 600 | — | 2 | — | 16 | — | 37.5 | — | — | 8 |
| Ex. 3 | — | 1000 | — | 2 | — | 16 | — | 62.5 | 8 | — |
| Ex. 4 | — | 600 | — | 2.7 | — | 4.6 | — | 130.4 | 1.7 | — |

TABLE 1-continued

|  | L1 | L2 | t2 | t3 | D1 | D2 | L1/D1 | L2/D2 | D2/t3 | D1/t2 |
|---|---|---|---|---|---|---|---|---|---|---|
| Ex. 5 | — | 1500 | — | 1.8 | — | 6.4 | — | 234.4 | 3.6 | — |
| Ex. 6 | — | 1500 | — | 1.2 | — | 17.6 | — | 85.2 | 14.7 | — |
| Ex. 7 | — | 1000 | — | 1.9 | — | 6.2 | — | 161.3 | 3.3 | — |

L1: Length of Clad Tube (mm)
L2: Length of Clad Portion (mm)
t2: Thickness of Outer Core Portion (mm)
t3: Thickness of Clad portion (mm)
D1: Diameter of Inner Core Portion (mm)
D2: Diameter of Core Portion (mm)

[Experiment 8]

In Experiment 8, the polymerization of 124.4 g MMA was made at 80° C. for 2 hours, so as to provide an inner wall of the clad tube with a polymer layer for the outer core portion. Thus a tube was obtained. In this tube, the polymerization of 75.6 g of the inner core liquid was made at 70° C. for 10 hours. Other conditions were the sama as Experiment 2. In the preform 15, the outer core layer 26 containing no dopants (namely having no refractive index distribution) had a thickness t2 of 2.2 mm, the inner core in which the dopants were dispersed to provide the refractive index distribution had a diameter D1 of 15.6 mm and the coefficient of the refractive index distribution of 2.5. The ratio (D1/t2) of the diameter D1 of the inner core portion 25 to the thickness t2 of the outer core portion 26 was 7.1, and a ratio (L1/D1) of the length L1 of the clad pipe to the diameter D1 of the inner core portion 25 was 38.5. Thus the preform 15 was uniformly formed without voids and deflects. The preform 15 was drawn with use of an ovent to 230° C. to the POF 17 whose profile of the refractive index was analogicus to that of the preform 15. In this drawing process, the generation of the voids was not observed.

In the drawing process, two POFs 17 were obtained. In first one of the POFs 17, the clad had the outer diameter of 316 μm, the outer core formed from PMMA had the outer diameter of 300 μm, and the inner core had the outer diameter of 234 μm and the refractive index distribution. In second one of the POFs 17, the clad had the outer diameter of 500 μm, the outer core formed from PMMA had the outer diameter of 475 μm, and the inner core had the outer diameter of 390 μm and the refractive index distribution.

The transmission losses of the POFs were measured with use of a light source for irradiating a light of 780 nm. One of the transmission losses was 114 dB/km when the diameter of the clad was 316 μm, and another one was 123 dB/km, when the diameter of the clad was 500 μm. Accordingly, these POFs had good characteristics.

[Example of Optical Connection]

In following, an example of the optical connection of the present invention will be described. A diameter 2Rb of the outer core 74 is 250 μm≦2Rb≦1000 μm, the ratio of a diameter 2Ra of the inner core 73 to the outer diameter 2Rb of the outer core 74 is 0.67≦Ra/Rb≦0.87. Further, in the POF 17, the exit numerical aperture (exit NA) is 0.12≦(exit NA)≦0.22.

Figure 9:
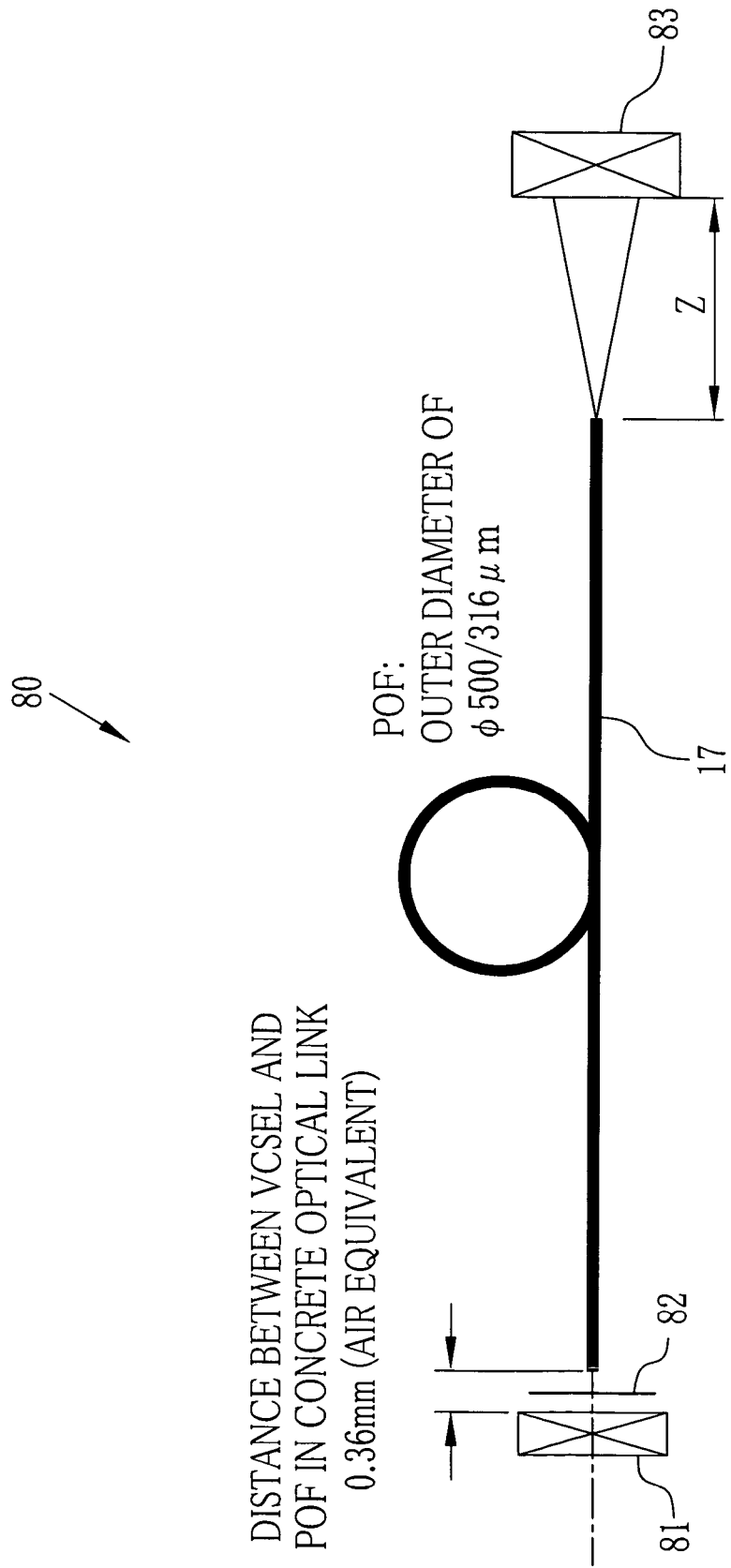
FIG. 9 is an explanatory view of a measurement system of a beam diameter of an exit beam.

The characteristics of the exit light of the POF 17 having the above structure will be explained in followings. In FIG. 9, a measuring system 80 for measuring a width of a laser beam exiting from an exit end of the POF 17 has a VCSEL (Vertical Cavity Surface Emitting Laser) 81 as a laser source. The number of emission spots of the VCSEL 81 is at most 4, and the exit NA is from 0.05 to 0.22. Further, the outer diameter of the incident beam into the POF 10 of the present invention is preferably smaller than an outer diameter 2Rb of the outer core 74 in order to prevent the connection loss at the entering into the core 71. Accordingly, the distance between the VCSEL 81 and the incident end of the POF 17 is adjustable such that the diameter of the laser beam may be the most adequate. Further, there is a detector 83 having a CCD camera for detecting the diameter of the laser beam, which is disposed in an exit end side at a distance Z apart from the POF 17. Further, there is a ND filter 82 between the VCSEL 81 and the POF 17. When the distance between the VCSEL 81 and the incident end face of the POF 17 is small, the ND filter 82 prevents that the too strong power of the exit beam from the POF 17 becomes over the detection range of the CCD camera of the detector 83.

The exit beam from the VCSEL 81 passes through the ND filter 82 to enter through an incident end into the POF 17. The POF 17 guides the incident beam to emit out from the exit end face. The detector 83 measures the outer diameter of the exit beam at a distance Z.

Figure 10:
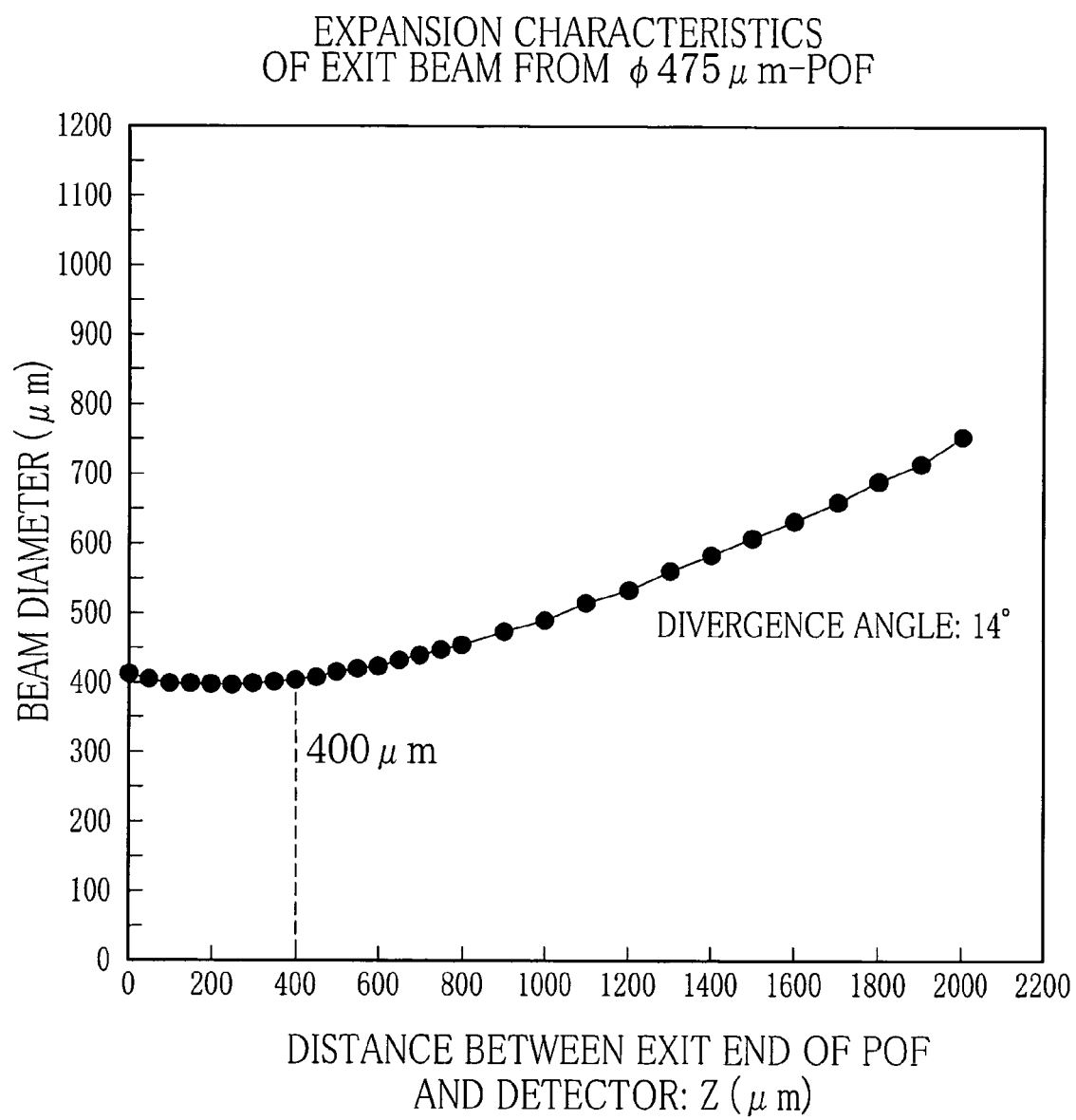
FIG. 10, 11 are graphs illustrating the variation of the beam diameter to an exit end of the POF of the present invention.

The results of the measurement of the diameter of the exit beam from the exit end with use of the measuring system 80 are illustrated in FIG. 10, and thereby the outer diameter of the clad 72 is 475 μm. Note that the POF 17 has a clad which is made of PVDF and has a refractive index nc at 1.42 and the diameter of 500 μm, the outer core which is made of PMMA and has the outer diameter 475 μm, and the inner core which is provided with the refractive index distribution by adding diphenylsulfide to the PMMA. The ratio (Ra/Rb) of the outer diameter 2Rb of the outer core 74 to the diameter 2Ra of the inner core 73 is 0.78. Further, the measurement was made with use of the POF of the Experiment 8, in which the maximal refractive index n1 at the center of the inner core is 1.505, the refractive index n2 of the outer core 74 is 1.492, and the distribution coefficient g of the refractive index is 2.5.

The VCSEL 81 has four emission spots to generate the laser beam having the wavelength 780 nm. Further, the beam strength of the exit beam of the VCSEL 81 has a Gaussians beam distribution, and the divergence angle of 180°. Note that the divergence angle is determined in a usual manner. Namely, the determination is made at a position at which the power of the beam may be $1/e^2$ of the largest power at the center of the POF 17 in the gaussians beam distribution. Note that the length of the POF 17 is 30 m.

While the distance Z is from 0 μm to 400 μm, the beam diameter doesn't become larger. The beam is parallel beam and the diameter thereof is about 400 μm. When the distance Z is more than 400 μm, the outer diameter becomes larger at 14° of the divergence angle, namely 0.12 of the exit NA from the POF. The measurement is made for 3 lots, among which the results are almost the same. Further, when the length of the POF 17 is changed to 10 m, 5 m and 2 m, and the other conditions are the same, the results of the measurement are the same. Note that the present invention is not restricted in the light-receiving device, but may be a connection to a semiconductor device, a plastic optical fibers, an optical connector.

Further, the measurement is made with use of the POF having the outer core 74 of the 300 μm outer diameter. The POF 17 has a clad which is made of PVDF and has a refractive index nc at 1.42 and the outer diameter of 316 μm, the outer core which is made of PMMA and has the outer diameter 300 μm, and the inner core which is provided with the refractive index distribution by adding diphenylsulfide to the PMMA. The ratio (Ra/Rb) of the outer diameter 2Rb of the outer core 74 to the diameter 2Ra of the inner core 73 is 0.78. Further, the maximal refractive index n1 at the center of the inner core is 1.505, the refractive index n2 of the outer core 74 is 1.492, and the distribution coefficient g of the refractive index is 2.5. Other conditions are the same as the measurement in FIG. 10.

Figure 11:
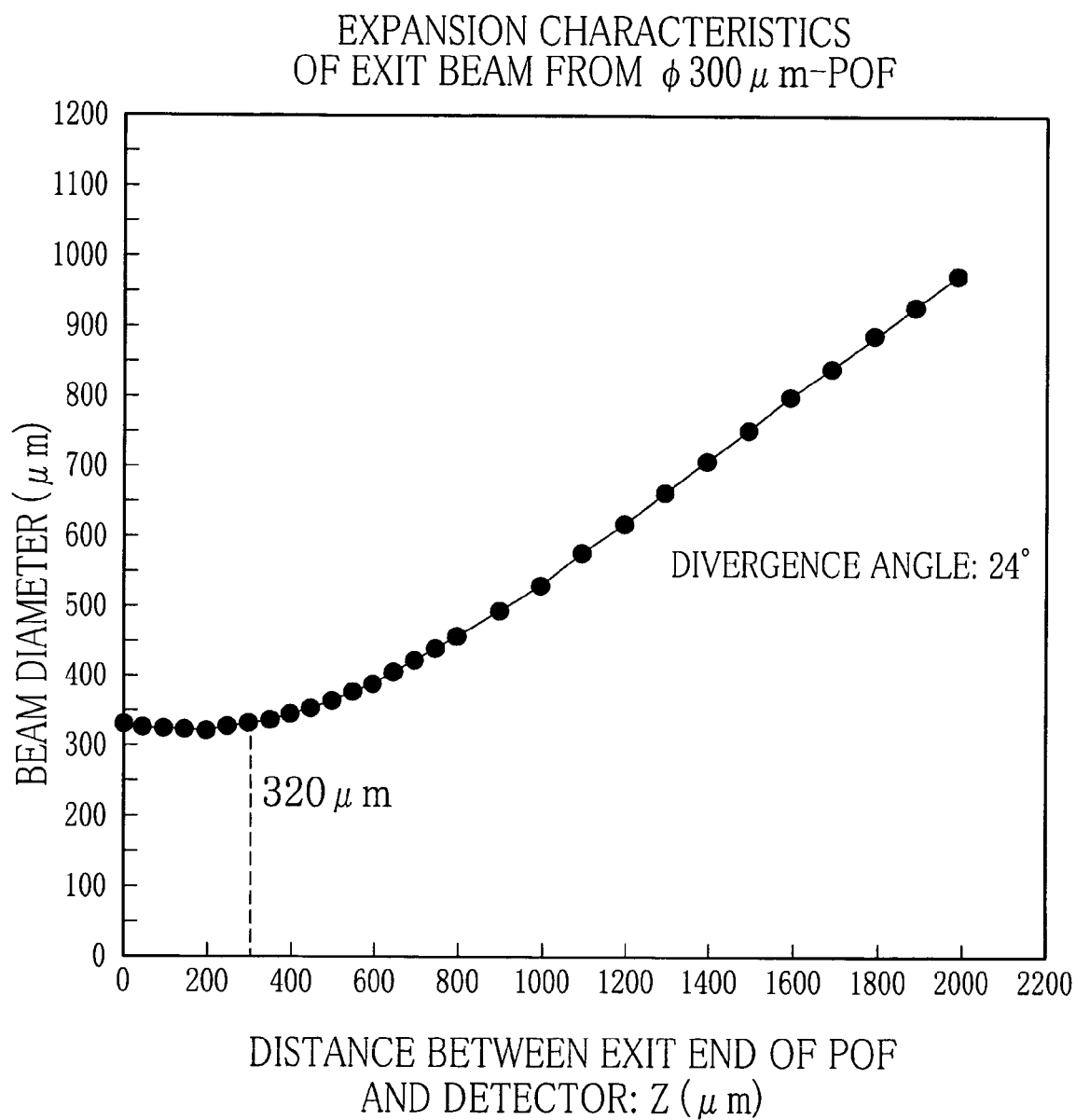

The results of this measurement are illustrated in FIG. 11. While the distance Z is from 0 μm to 320 μm, the outer diameter of the beam doesn't become larger. The beam is parallel beam and the diameter thereof is about 300 μm. When the distance Z is more than 320 μm, the outer diameter becomes larger at 24° of the divergence angle, namely 0.21 of the exit NA from the POF.

Furthermore, the measurement of a step index POF (hereinafter SI-POF) is made. The SI-POF is 30 m in length and has the clad of the 750 μm outer diameter. The results thereof are illustrated in FIG. 15. Other conditions are the same as the measurements in FIGS. 10&11. As shown in FIG. 15, the exit beam of the SI-POF is exits from the exit end of the POF and simultaneously diffracts to become wider.

Figure 16:
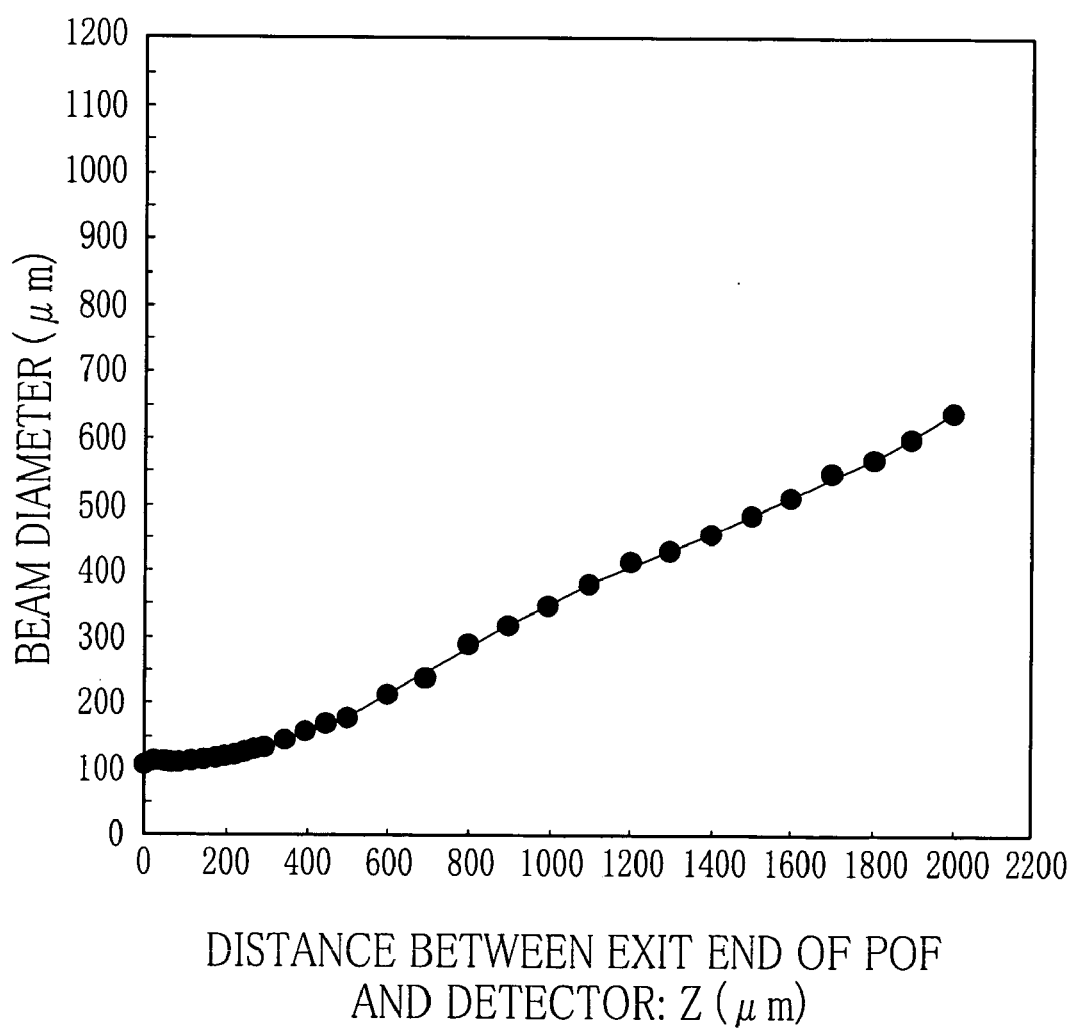

Further, the measurement is made with use of a GI-POF having no outer core, which is different from the GI-POF of the present invention, and the results thereof are illustrated in FIG. 16. The outer diameter and the length of the clad are respectively 125 μm and 30 m. Other conditions are the same as the measurements in FIGS. 10&11. As shown in FIG. 16, in the GI-POF used in this measurement, there are no ranges in which the exit beam becomes parallel, which is different from the GI-POF (POF 17) of the present invention. The exit beam becomes wider when the distance Z is about 50 μm to 100 μm. This range of the distance Z is not adequate for disposing the optical elements having no condensing functions, between the optical fibers without interposition of the optical system.

According to the results of this measurement, when the SI-POF or the GI-POF of the prior art is used, the exit beam does not propagate without the outer diameter becoming wider until the distance Z is adequate for disposing the optical function elements. However, in the present invention, the exit beam propagates without becoming wider until the distance Z is adequate for disposing the optical function element.

Further, the coupling efficiency of the photodetector (PD) to the exit beam from the exit end of the POF 17 is measured. The opening diameter of a photodiode (PD) is 400 μm, and the outer diameter of the outer core is 475 μm (the same as that of the first measurement in FIG. 10). The coupling efficiency is about 100% while the distance Z from the exit end to the photodiode (PD) is at most 300 μm.

Still another measurement with use of two POFs (POF(A) and POF(B)) is made as follows. The two POF are arranged such that the exit end of the POF(A) and the incident end of POF(B) may be confronted at a distance Y. When the exit beam from the POF(A) enters through the incident end into the POF(B), the change of the coupling efficiency depending on the distance Y is measured. The results of the measurement was plotted on the graph in FIG. 13. The outer diameter and the length of the clad of each POF(A) and (B) is respectively 475 μm and 30 m. As the laser source, the VCSEL 81 is used the same as the measurement in FIG. 9. As shown in FIG. 13, when the distance Y is at most 300 μm, the coupling efficiency is about 100%. The reason therefor is that the diameter of the exit beam from the POF(A) doesn't become larger in effect of the diffraction while the distance Y is at most 300 μm.

Various changes and modifications are possible in the present invention and may be understood to be within the present invention.

What is claimed is:

1. An optical coupling method comprising:
providing a first graded-index with no optical converging elements connected thereto;
confronting an exit end of the first graded-index optical fiber to an incident end of a second graded-index optical fiber or a light-receiving device; and
forming a gap between said exit end and said incident end, said gap being at least 200 μm; and further comprising a light propagating in an inner core of the optical fiber, said inner core having a refractive index distribution; and a light propagating in an outer core of the optical fiber surrounding said inner core and having a substantially constant refractive index,
wherein the light propagates in said outer core which has an outer diameter in the range of 250 μm to 1000 μm, and wherein the light propagates in the outer and the inner cores with a ratio of a diameter of said inner core to said outer diameter being in the range of 0.67 to 0.87.

2. An optical coupling method claimed in claim 1, wherein the light propagates in the inner core with a coefficient of said refractive index distribution being in the range of 1.5 to 4.0.

3. An optical coupling method claimed in claim 1, further comprising a light exiting from an exit of said optical fiber having a numerical aperture in a range of 0.12 to 0.22.

4. An optical coupling method claimed in claim 1, further comprising generating a light incident into said optical fiber in a light emitting device and the light exiting from an exit of the light emitting device having a numerical aperture in a range of 0.05 to 0.22.

5. An optical coupling method claimed in claim 4, wherein the light exits from a vertical cavity surface emitting laser serving as said light emitting device.

6. An optical coupling method claimed in claim 1, wherein optically functional elements having no optical converging functions are provided in said gap.

7. The optical coupling method claimed in claim 1, wherein said first-graded index optical fiber comprises an inner core and an outer core and wherein said confronting comprises confronting an end of the inner core having a refractive index distribution and an end of the outer core surrounding said inner core and having a substantially constant refractive index, to the incident end of the second graded-index optical fiber.

8. An optical coupling method comprising:
providing a first graded-index optical fiber with an optical converging function not being limited by the length of the first graded-index optical fiber and with no optical converging elements connected thereto;
confronting an exit end of the first graded-index optical fiber to an incident end of a second graded-index optical fiber or a light-receiving device; and
forming a gap between said exit end and said incident end, said gap being at least 200 μm;
wherein said first-graded index optical fiber comprises an inner core and an outer core and wherein said confronting comprises confronting an end of the inner core having a refractive index distribution and an end of the outer core surrounding said inner core and having a substantially constant refractive index, to the incident end of the second graded-index optical fiber; and
wherein said confronting comprises confronting to the incident end of the second graded-index optical fiber, said outer core with an outer diameter in the range of 250 μm to 1000 μm and a ratio of a diameter of said inner core to said outer diameter being in the range of 0.67 to 0.87.

9. An optical coupling method comprising:
providing a first graded-index optical fiber with an optical converging function not being limited by the length of the first graded-index optical fiber and with no optical converging elements connected thereto;
confronting an exit end of the first graded-index optical fiber to an incident end of a second graded-index optical fiber or a light-receiving device; and
forming a gap between said exit end and said incident end, said gap being at least 200 μm;
wherein the exit end of the first graded-index optical fiber, having a numerical aperture in a range of 0.12 to 0.22 is confronted to the incident end of the second graded-index optical fiber.

10. The optical coupling method claimed in claim 1, wherein the first graded-index optical fiber and the second graded-index optical fiber are plastic optical fibers being confronted to each other.

11. The optical coupling method of claim 1, wherein the exit end of the first graded-index optical fiber is confronted to the incident end of a second graded-index optical fiber with no optical converging elements connected thereto or the light receiving device with no optical converging elements connected thereto, and wherein the gap has no optical elements with converging function.

12. An optical coupling method comprising:
providing a first graded-index optical fiber with an optical converging function not being limited by the length of the first graded-index optical fiber and with no optical converging elements connected thereto;
confronting an exit end of the first graded-index optical fiber to an incident end of a second graded-index optical fiber or a light-receiving device; and
forming a gap between said exit end and said incident end, said gap being at least 200 μm;
wherein optical convergence in the first graded-index optical fiber is achieved with having an inner core with a refractive index distribution being in a range of 1.5 to 4.0 and having an outer core with substantially constant refractive index.

13. The optical coupling method of claim 1, wherein the length of the first graded-index optical fiber is 30 meters or less.

14. The optical coupling method of claim 1, wherein the exit end of the first graded-index optical fiber is flat.

* * * * *